US011546950B2

United States Patent
Kadiri et al.

(10) Patent No.: US 11,546,950 B2
(45) Date of Patent: Jan. 3, 2023

(54) TRUNCATED IDENTIFICATION INDICATORS FOR EARLY USER EQUIPMENT (UE) CAPABILITY RETRIEVAL

(71) Applicant: QUALCOMM Incorporated, San Diego, CA (US)

(72) Inventors: Prasad Reddy Kadiri, San Diego, CA (US); Bharat Shrestha, San Diego, CA (US); Mungal Singh Dhanda, Slough (GB); Alberto Rico Alvarino, San Diego, CA (US); Luis Fernando Brisson Lopes, Swindon (GB); Umesh Phuyal, San Diego, CA (US); Miguel Griot, La Jolla, CA (US); Sebastian Speicher, Wallisellen (CH)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/154,921

(22) Filed: Jan. 21, 2021

(65) Prior Publication Data
US 2021/0259031 A1 Aug. 19, 2021

Related U.S. Application Data

(60) Provisional application No. 62/975,939, filed on Feb. 13, 2020.

(51) Int. Cl.
*H04W 76/11* (2018.01)
*H04W 76/27* (2018.01)
(Continued)

(52) U.S. Cl.
CPC .............. *H04W 76/11* (2018.02); *H04W 4/70* (2018.02); *H04W 8/08* (2013.01); *H04W 8/24* (2013.01); *H04W 48/16* (2013.01); *H04W 76/27* (2018.02)

(58) Field of Classification Search
CPC ......... H04W 8/24; H04W 76/11; H04W 4/70; H04W 8/08; H04W 48/16; H04W 76/27;
(Continued)

(56) References Cited

U.S. PATENT DOCUMENTS

2019/0150218 A1 5/2019 Futaki
2021/0212147 A1* 7/2021 Zheng ................... H04W 76/25
2021/0368547 A1 11/2021 Kadiri et al.

FOREIGN PATENT DOCUMENTS

WO WO-2019193562 A1 10/2019

OTHER PUBLICATIONS

Huawei, et al., "Support of RRC Connection Re-Establishment for the Control plane for NB-IoT Connected to 5GC", 3GPP TSG-RAN WG2 Meeting #108, 3GPP Draft; R2-1915318, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 18, 2019-Nov. 22, 2019, pp. 1-5, Nov. 8, 2019 (Nov. 8, 2019), XP051817153, Retrieved from the Internet: URL: https://ftp.3gpp.org/tsg_ran/WG2_RL2/TSGR2_108/Docs/R2-1915318.zip R2-1915318 RRC Connection Reestablishment for CP in 5GC.docx [retrieved on Nov. 8, 2019] the whole document.

(Continued)

*Primary Examiner* — Diane D Mizrahi
(74) *Attorney, Agent, or Firm* — Holland & Hart LLP

(57) ABSTRACT

Methods, systems, and devices for wireless communication are described. A user equipment (UE) may truncate or remove a number of bits from its UE identity based on identity truncating information to generate a truncated UE identity. The truncated UE identity can be transmitted by eMTC devices to a base station in an RRC connection request, and can be used by the base station to determine which core network entity stores the UE's capabilities. In some implementations, the UE may truncate or remove a (Continued)

number of bits from the 48-bit 5G-S-TMSI based on the identity truncating information to generate a 40-bit truncated 5G-S-TMSI that can be transmitted by an eMTC device to the base station in the RRC connection request and yet still provide the base station with enough information to determine which AMF stores the UE context.

24 Claims, 14 Drawing Sheets

(51) Int. Cl.
  *H04W 4/70* (2018.01)
  *H04W 8/08* (2009.01)
  *H04W 48/16* (2009.01)
  *H04W 8/24* (2009.01)
(58) Field of Classification Search
  CPC ....... H04W 8/22; H04W 48/12; H04W 60/00; H04W 8/26
  See application file for complete search history.

(56) References Cited

OTHER PUBLICATIONS

International Search Report and Written Opinion—PCT/US2021/014713—ISA/EPO—dated May 7, 2021.
Qualcomm Incorporated: "Discussion on System Aspects of Connection Reestablishment for Control Plane for NB-IoT", 3GPP Draft; SA WG2 Meeting #135, S2-1909912_DP_REESTABLISHMENT_R2_LS_R2-1908264 V2, 3rd Generation Partnership Project (3GPP), Mobile Competence Centre, 650, Route Des Lucioles, F-06921 Sophia-Antipolis Cedex, France, vol. SA WG2, No. Split, Croatia; Oct. 14, 2019-Oct. 18, 2019, 3 Pages, Oct. 4, 2019 (Oct. 4, 2019), XP051802105, Retrieved from the Internet: URL: https://ftp.3gpp.org/Meetings_3GPP_SYNC/SA2/Docs/S2-1909912.zip S2-1909912_DP_Reestablishment_R2_LS_R2-1908264_v2.doc [retrieved on Oct. 4, 2019] the whole document.
SA2: "[Draft ] Reply LS on RRC Connection Re-Establishment for CP for NB-IoT", 3GPP Draft, SA WG2 Meeting #134, S2-1907103_LS_OUT_RAN2_REESTABLISHMENT_NBI_OT, 3rd Generation Partnership Project (3GPP), Mobile Competence Centre, 650, Route Des Lucioles, F-06921, Sophia-Antipolis Cedex, France, vol. SA WG2, No. Sapporo, Japan; Jun. 24, 2019-Jun. 28, 2019, Jun. 17, 2019 (Jun. 17, 2019), XP051752079, 8 Pages, Retrieved from the Internet: URL: http://www.3gpp.org/ftp/tsg%5Fsa/WG2%5FArch/TSGS2%5F134%5FSapporo/Docs/S2%2D1907103%2Ezip [retrieved on Jun. 17, 2019] the whole document.
"3rd Generation Partnership Project, Technical Specification Group Radio Access Network, Evolved Universal Terrestrial Radio Access (E-UTRA), Radio Resource Control (RRC), Protocol specification (Release 13)", 3GPP Standard, 3GPP TS 36.331, 3rd Generation Partnership Project (3GPP), Mobile Competence Centre, 650, Route Des Lucioles, F-06921 Sophia-Antipolis Cedex, France, vol. RAN WG2, No. V13.1.0, Apr. 1, 2016 (Apr. 1, 2016), pp. 1-551, XP051088537, [retrieved on Apr. 1, 2016] section 6.3.2 (p. 318 in particular).
Qualcomm Inc: "Early UE Capability Retrieval Enhancements for eMTC/5GC", 3GPP Draft, 3GPP TSG-RAN WG2 Meeting #109bis-e, R2-2002610 Revision of R2-2000536, 3rd Generation Partnership Project (3GPP), Mobile Competence Centre, 650, Route Des Lucioles, F-06921 Sophia-Antipolis Cedex, France, vol. RAN WG2, No. Online Meeting, Apr. 20, 2020-Apr. 30, 2020 Apr. 10, 2020 (Apr. 10, 2020), XP051870871, 5 Pages, Retrieved from the Internet: URL:https://ftp.3gpp.org/tsg_ran/WG2_RL2/TSGR2_109bis-e/Docs/R2-2002610.zip R2-2002610_Early UE capability retrieval enhancements_v4.1.doc [retrieved on—Apr. 10, 2020] sections 1 to 2.3.
Qualcomm Inc: "Early UE Capability Retrieval Enhancements for eMTC/5GC", 3GPP Draft, 3GPP TSG-RAN WG2 Meeting #109e, R2-2000536, 3rd Generation Partnership Project (3GPP), Mobile Competence Centre, 650, Route Des Lucioles, F-06921 Sophia-Antipolis Cedex, France, vol. RAN WG2, No. E-Meeting, Feb. 24, 2020-Mar. 6, 2020 Feb. 13, 2020 (Feb. 13, 2020), XP051849117, 4 Pages, Retrieved from the Internet: URL:https://ftp.3gpp.org/tsg_ran/WG2_RL2/TSGR2_109_e/Docs/R2-2000536.zip R2-2000536_Early UE Capability Retrieval Enhancements_v3.doc [retrieved on Feb. 13, 2020] From section 1 to section 2.3.
Qualcomm Inc, et al., "Early UE Capability Retrieval Enhancements for eMTC/5GC", 3GPP Draft, 3GPP TSG-RAN WG2 Meeting #111e, R2-2006792 Revision of R2-2004841,3rd Generation Partnership Project (3GPP), Mobile Competence Centre, 650, Route Des Lucioles, F-06921 Sophia-Antipolis Cedex, France, vol. RAN WG2, No. E-Meeting, Aug. 17, 2020-Aug. 28, 2020 Aug. 7, 2020 (Aug. 7, 2020), XP051911699, 10 Pages, Retrieved from the Internet: URL:https://ftp.3gpp.org/tsg_ran/WG2_RL2/TSGR2_111-e/Docs/R2-2006792.zip—R2-2006792 Early UE Capability Retrieval Enhancements for eMTC Connected to 5GC_v4.doc [retrieved on Aug. 7, 2020] sections 2.2. 2.3. 2.4.

* cited by examiner

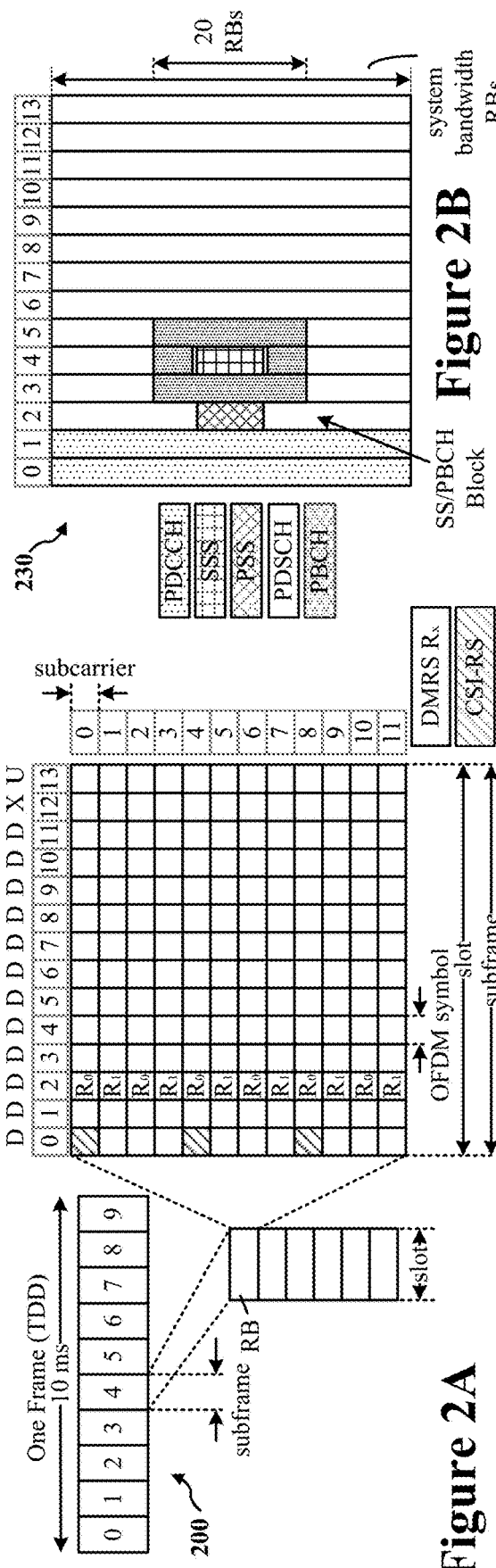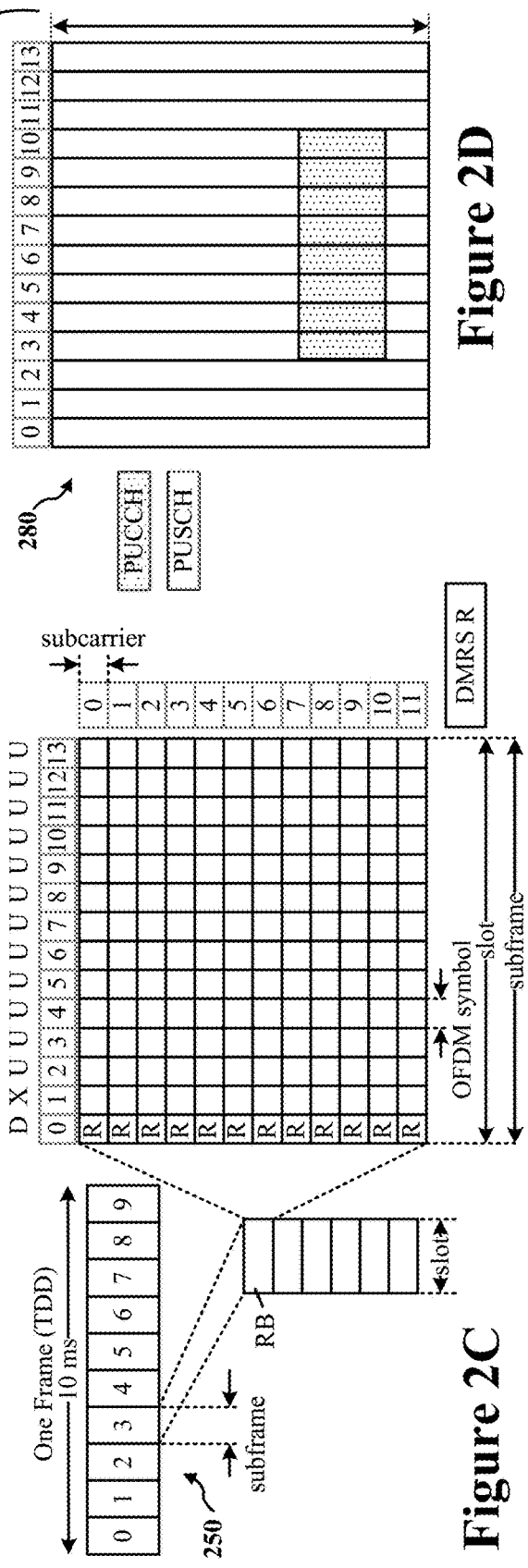
Figure 2A  Figure 2B  Figure 2C  Figure 2D

TRUNCATED IDENTIFICATION INDICATORS FOR EARLY USER EQUIPMENT (UE) CAPABILITY RETRIEVAL

CROSS REFERENCE

The present Application for Patent claims the benefit of U.S. Provisional Patent Application No. 62/975,939 by KADIRI et al., entitled "TRUNCATED IDENTIFICATION INDICATORS FOR EARLY USER EQUIPMENT (UE) CAPABILITY RETRIEVAL," filed Feb. 13, 2020, assigned to the assignee hereof, and expressly incorporated by reference herein.

TECHNICAL FIELD

This disclosure relates generally to wireless communications and, more specifically, to truncated identification indicators.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

SUMMARY

A method for wireless communication performed by a user equipment (UE) having a UE identity is described. The method may include receiving identity truncating information, generating a truncated UE identity by truncating one or more fields of the UE identity based on the identity truncating information, and transmitting the truncated UE identity to a base station (BS) during establishment of a radio resource control (RRC) connection with the BS.

An apparatus for wireless communication performed by a UE having a UE identity is described. The apparatus may include a processor, memory in electronic communication with the processor, and instructions stored in the memory. The instructions may be executable by the processor to cause the apparatus to receive identity truncating information, generate a truncated UE identity by truncating one or more fields of the UE identity based on the identity truncating information, and transmit the truncated UE identity to a base station (BS) during establishment of an RRC connection with the BS.

Another apparatus for wireless communication performed by a UE having a UE identity is described. The apparatus may include means for receiving identity truncating information, means for generating a truncated UE identity by truncating one or more fields of the UE identity based on the identity truncating information, and means for transmitting the truncated UE identity to a base station (BS) during establishment of an RRC connection with the BS.

A non-transitory computer-readable medium storing code for wireless communication performed by a UE having a UE identity is described. The code may include instructions executable by a processor to receive identity truncating information, generate a truncated UE identity by truncating one or more fields of the UE identity based on the identity truncating information, and transmit the truncated UE identity to a base station (BS) during establishment of an RRC connection with the BS.

In some examples of the method, apparatuses, and non-transitory computer-readable medium described herein, the identity truncating information indicates a number of least significant bits (LSBs) of at least one field of the one or more fields of the UE identity to retain during generation of the truncated UE identity.

In some examples of the method, apparatuses, and non-transitory computer-readable medium described herein, a first value indicating the number of LSBs of an Access and Mobility Management Function (AMF) set identifier of the UE identity and a second value indicating the number of LSBs of an AMF pointer of the UE identity.

In some examples of the method, apparatuses, and non-transitory computer-readable medium described herein, generating the truncated UE identity may include operations, features, means, or instructions for retaining only a number of LSBs according to the first value of the AMF set identifier of the UE identity and retaining only a number of LSBs according to the second value of the AMF pointer of the UE identity.

In some examples of the method, apparatuses, and non-transitory computer-readable medium described herein, generating the truncated UE identity may include operations, features, means, or instructions for retaining only a (40−n−m) number of LSBs of a Temporary Mobile Station Identifier (TMSI) of the UE identity, where n represents the first value and m represents the second value.

In some examples of the method, apparatuses, and non-transitory computer-readable medium described herein, the UE includes an enhanced machine type communications (eMTC) device, the UE identity includes 48 bits, and the truncated UE identity includes of 40 bits.

In some examples of the method, apparatuses, and non-transitory computer-readable medium described herein, the truncated UE identity may be transmitted to the BS in an RRC connection request message.

Some examples of the method, apparatuses, and non-transitory computer-readable medium described herein may further include operations, features, means, or instructions for receiving, from the BS, an RRC connection setup message indicating a signaling radio bearer (SRB) configuration based on UE capabilities retrieved from an Access and Mobility Management Function (AMF) of a core network.

In some examples of the method, apparatuses, and non-transitory computer-readable medium described herein, retrieval of the UE capabilities from the AMF may be based on the truncated UE identity.

In some examples of the method, apparatuses, and non-transitory computer-readable medium described herein, receiving the identity truncating information may include operations, features, means, or instructions for receiving the identity truncating information from the BS in a system information block (SIB).

Some examples of the method, apparatuses, and non-transitory computer-readable medium described herein may further include operations, features, means, or instructions for transmitting, to an Access and Mobility Management Function (AMF) of a core network, a Non-Access Stratum (NAS) registration request message and receiving, from the AMF, a NAS registration accept message containing the identity truncating information.

Some examples of the method, apparatuses, and non-transitory computer-readable medium described herein may further include operations, features, means, or instructions for receiving, in an SIB broadcast by the BS, an indication to include the truncated UE identity in an RRC connection request message.

A method for wireless communication performed by a base station (BS) is described. The method may include indicating identity truncating information for truncating one or more fields of a UE identity to a UE, the identity truncating information indicating a number of least significant bits (LSBs) of at least one field of the one or more fields of the UE identity to retain and receiving a truncated UE identity from the UE in an RRC connection request message, the truncated UE identity generated according to the identity truncating information.

An apparatus for wireless communication performed by a base station (BS) is described. The apparatus may include a processor, memory in electronic communication with the processor, and instructions stored in the memory. The instructions may be executable by the processor to cause the apparatus to indicate identity truncating information for truncating one or more fields of a UE identity to a UE, the identity truncating information indicating a number of least significant bits (LSBs) of at least one field of the one or more fields of the UE identity to retain and receive a truncated UE identity from the UE in an RRC connection request message, the truncated UE identity generated according to the identity truncating information.

Another apparatus for wireless communication performed by a base station (BS) is described. The apparatus may include means for indicating identity truncating information for truncating one or more fields of a UE identity to a UE, the identity truncating information indicating a number of least significant bits (LSBs) of at least one field of the one or more fields of the UE identity to retain and means for receiving a truncated UE identity from the UE in an RRC connection request message, the truncated UE identity generated according to the identity truncating information.

A non-transitory computer-readable medium storing code for wireless communication performed by a base station (BS) is described. The code may include instructions executable by a processor to indicate identity truncating information for truncating one or more fields of a UE identity to a UE, the identity truncating information indicating a number of least significant bits (LSBs) of at least one field of the one or more fields of the UE identity to retain and receive a truncated UE identity from the UE in an RRC connection request message, the truncated UE identity generated according to the identity truncating information.

In some examples of the method, apparatuses, and non-transitory computer-readable medium described herein, indicating the identity truncating information may include operations, features, means, or instructions for transmitting the identity truncating information to the UE in an SIB.

In some examples of the method, apparatuses, and non-transitory computer-readable medium described herein, a presence of the identity truncating information in the SIB includes an indication for the UE to transmit the truncated UE identity to the BS in the RRC connection request message.

In some examples of the method, apparatuses, and non-transitory computer-readable medium described herein, indicating the identity truncating information may include operations, features, means, or instructions for broadcasting an indication for UEs to use truncated UE identities during RRC connection procedures.

Some examples of the method, apparatuses, and non-transitory computer-readable medium described herein may further include operations, features, means, or instructions for receiving the identity truncating information from an Access and Mobility Management Function (AMF) of a core network.

In some examples of the method, apparatuses, and non-transitory computer-readable medium described herein, a first value indicating the number of LSBs of an AMF set identifier of the UE identity and a second value indicating the number of LSBs of an AMF pointer of the UE identity.

Some examples of the method, apparatuses, and non-transitory computer-readable medium described herein may further include operations, features, means, or instructions for determining a difference value of (40−n−m) which indicates the number of LSBs of a Temporary Mobile Station Identifier (TMSI) of the UE identity to be retained when generating the truncated UE identity, where n represents the first value and m represents the second value.

In some examples of the method, apparatuses, and non-transitory computer-readable medium described herein, at least one of the first value or the second value may be based on a number of AMFs allocated to the core network.

Some examples of the method, apparatuses, and non-transitory computer-readable medium described herein may further include operations, features, means, or instructions for constructing an AMF identifier based on the truncated UE identity and identifying which AMF of a number of AMFs stores capability information for the UE based on the constructed AMF identifier.

In some examples of the method, apparatuses, and non-transitory computer-readable medium described herein, construction of the AMF identifier in a given AMF Region identified by a AMF region ID may be further based on a number of most significant bits (MSBs) of the AMF set identifier and the AMF pointer, and on the LSBs of the AMF set identifier and the AMF pointer.

In some examples of the method, apparatuses, and non-transitory computer-readable medium described herein, the MSBs of the AMF set identifier and the AMF pointer may be received from the identified AMF.

Some examples of the method, apparatuses, and non-transitory computer-readable medium described herein may further include operations, features, means, or instructions for retrieving the UE capability information and Inter-UE quality of service (QoS) information from the identified AMF, determining a signaling radio bearer (SRB) configuration for the UE based on the retrieved UE capability information, and transmitting the SRB configuration to the UE in an RRC connection setup message.

Some examples of the method, apparatuses, and non-transitory computer-readable medium described herein may further include operations, features, means, or instructions for transmitting an RRC connection reject message to the UE based on the Inter-UE QoS information and traffic loading of the BS.

In some examples of the method, apparatuses, and non-transitory computer-readable medium described herein, the UE includes an enhanced machine type communications (eMTC) device, the UE identity includes 48 bits, and the truncated UE identity includes of 40 bits.

Some examples of the method, apparatuses, and non-transitory computer-readable medium described herein may further include operations, features, means, or instructions for receiving the identity truncating information from a core network entity.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

Like reference numbers and designations in the various drawings indicate like elements.

DETAILED DESCRIPTION

Figure 1:
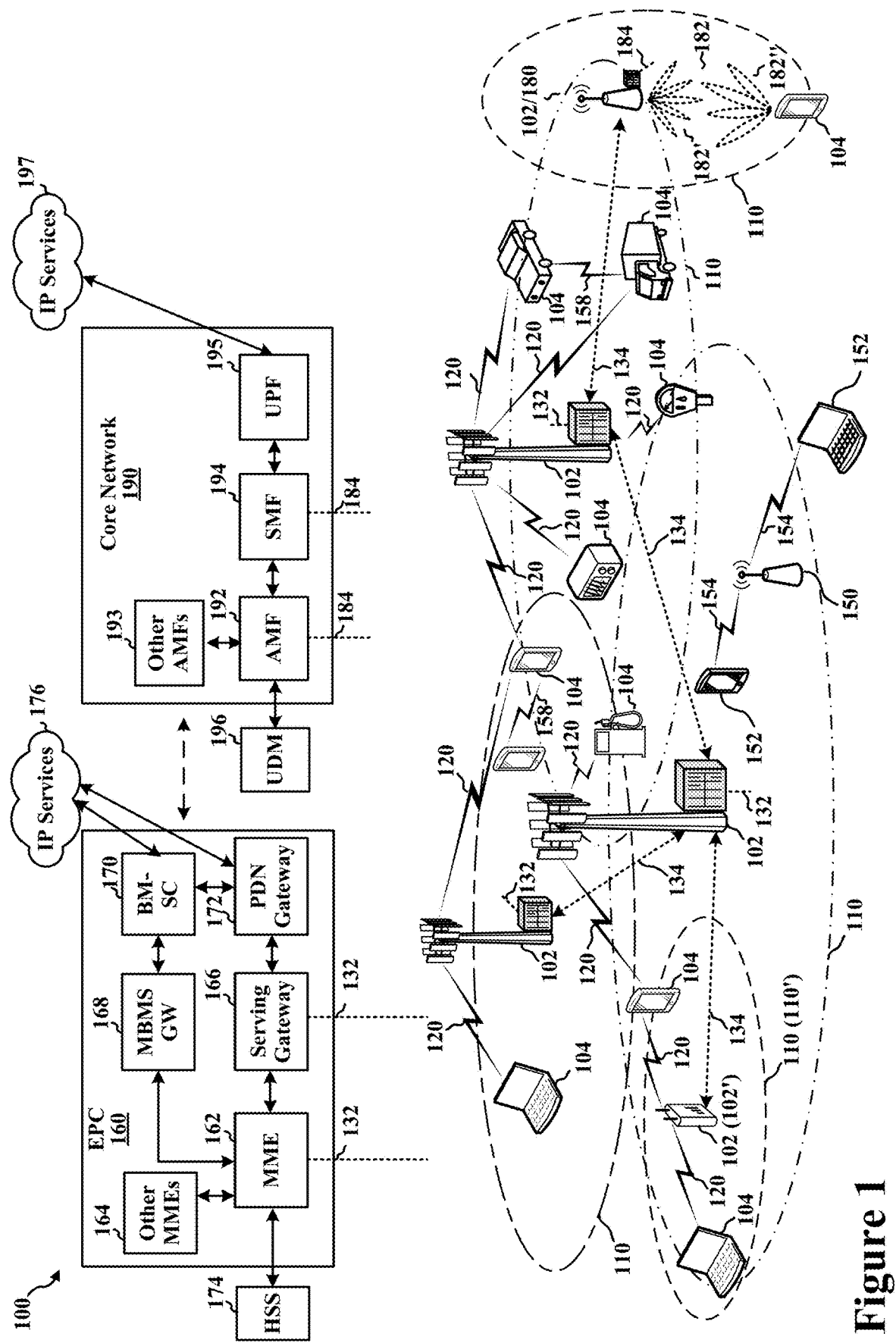
FIG. 1 shows a diagram illustrating an example wireless communications system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Implementations of the subject matter described in this disclosure may allow for the early retrieval of UE capabilities when a UE seeking to establish a connection with a radio access network is not capable of transmitting its UE identity in a single RRC message. An RRC connection request for a base station associated with a 5G core network typically includes a 48-bit 5G-S-TMSI that uniquely identifies the UE and also uniquely identifies the core network entity that stores the UE context (such as UE capabilities). Some UEs, such as eMTC devices, are not capable of sending the entire 48-bit 5G-S-TMSI to a base station in a single RRC message, and instead send the 40 least significant bits (LSBs) of the 5G-S-TMSI in an RRC connection request, and then send the remaining 8 bits of the 5G-S-TMSI to the base station in an RRC connection setup complete message. However, the 8 most significant bits (MSBs) of the 5G-S-TMSI correspond to the 8-bit AMF set ID, which is necessary for the base station to determine which AMF has stored the UE context. As a result, the base station may not be able to identify the AMF and retrieve the UE capabilities until reception of the RRC connection setup complete message, which occurs after the base station selects and transmits a signaling radio bearer (SRB) configuration to the UE.

Selecting a SRB configuration without knowing a UE's radio capabilities may limit the base station's ability to tailor or optimize the SRB configuration for the UE. This may be particularly problematic for cellular IoT (CIoT) devices, such as eMTC or NB-IoT devices, using control plane optimization for small data transmission and these CIoT devices may have varying radio capabilities for different radio enhancements. Thus, it is desirable for the base station to obtain the UE radio capabilities of such devices before selecting and transmitting the SRB configuration in the RRC connection setup message.

In accordance with various aspects of the present disclosure, a UE may truncate or remove a number of bits from its UE identity based on identity truncating information to generate a truncated UE identity. The truncated UE identity can be transmitted by eMTC devices to a base station in an RRC connection request, and can be used by the base station to determine which core network entity (such as an AMF) stores the UE's capabilities. In some implementations, the UE may truncate or remove a number of bits from the 48-bit 5G-S-TMSI based on the identity truncating information to generate a 40-bit truncated 5G-S-TMSI that can be transmitted by an eMTC device to the base station in the RRC connection request and yet still provide the base station with enough information to determine which AMF stores the UE context. This allows the base station to retrieve the UE capabilities from the AMF before selecting the SRB configuration for the UE. In this manner, the base station can select or determine the SRB configuration for UEs based on their capabilities, even for UEs such as eMTC devices that may not be capable of transmitting the 48-bit 5G-S-TMSI in an RRC message.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may be a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 via S1 interfaces, and the base stations 102 configured for 5G NR may interface with the core network 190 through backhaul links 184 via N2 and N3 interfaces. The base stations 102 may communicate with one another through one or more backhaul links 134 via X2 interfaces. The base stations 102 may perform a number of functions including (but not limited to) the transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 404 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

The wireless communications system may further include a Wi-Fi access point (AP) 150 in communication with Wi-Fi stations (STAs) 152 via communication links 154 in a 2.4 GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

A given base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some UEs 104 may be referred to as IoT devices (such as a parking meter, gas pump, toaster, vehicles, heart monitor, etc.). Other UEs 104 may be referred to as cellular IoT (CIoT) devices (such as a smartphone capable of narrowband communications based on one or more designed for IoT devices). A UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A base station 102, whether a small cell 102' or a large cell (such as a macro base station), may include an eNB, gNodeB (gNB), or another type of base station. Some base stations, such as gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW or near mmW radio frequency band (such as between 3 GHz-300 GHz) has extremely high path loss and a short range. The mmW base station 180 may utilize beamforming 182 with the UE 104 to compensate for the extremely high path loss and short range. Beamforming, which may also be referred to as spatial filtering, directional transmission, or directional reception, is a signal processing technique that may be used at a transmitting device or a receiving device (such as a base station 102 or a UE 104) to shape or steer an antenna beam along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

For example, the base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The base stations 102 and the UEs 104 may wirelessly communicate with each other via one or more communication links 120 using one or more carriers. The term "carrier" may refer to a set of radio frequency spectrum resources having a defined physical layer structure for supporting the communication links 120. For example, a carrier used for a communication link 120 may include a portion of a radio frequency spectrum band (such as a bandwidth part (BWP)) that is operated according to physical layer channels for a given radio access technology. Each physical layer channel may carry acquisition signaling (such as synchronization signals, system information), control signaling that coordinates operation for the carrier, user data, or other signaling. The wireless communications system 100 may support communications between the base station 102 and the UEs 104 using carrier aggregation or multi-carrier operation. Carrier aggregation may be used with both frequency division duplexing (FDD) and time division duplexing (TDD) component carriers. Allocation of carriers may be asymmetric with respect to the DL and UL channels, for example such that the UL and DL channels may include different numbers of carriers. The component carriers may include a primary component carrier and one or more secondary component carriers. A primary component carrier may be referred to as a primary cell (PCell), and a secondary component carrier may be referred to as a secondary cell (SCell).

In some examples, a carrier may support multiple cells, and different cells may be configured according to different protocol types (such as MTC, NB-IoT, enhanced mobile broadband (eMBB), or others) that may provide access for different types of devices.

The communication links 120 may include uplink (UL) transmissions from a UE 104 to a base station 102 or downlink (DL) transmissions from a base station 102 to a UE 104. The communication links 120 may use multiple-input and multiple-output (MIMO) antenna technology, for example, to provide spatial multiplexing, beamforming, or transmit diversity. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some UEs 104, such as MTC or IoT devices, may be low cost or low complexity devices and may provide for automated communication between machines (such as by using Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay such information to a central server or application program that makes use of the information or presents the information to humans interacting with the application program. Some UEs 104 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 104 and a base station 102 or EPC 160 supporting radio bearers for user plane data. At the Physical layer, transport channels may be mapped to physical channels.

The EPC 160 may provide user authentication, access authorization, tracking, Internet Protocol (IP) connectivity, and other access, routing, or mobility functions. In some implementations, the EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is a control plane entity that manages access and mobility, and may be in communication with a Home Subscriber Server (HSS) 174. The MME 162 may manage non-access stratum (NAS) functions such as mobility, authentication, and bearer management for UEs 104 served by base stations 104 associated with the EPC 160, and may process the signaling between the UEs 104 and the EPC 160. All user IP packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, one or more other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. User IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some instances, the 5G NR frame structure may be FDD in which, for a particular set of subcarriers (carrier system bandwidth), slots within the set of subcarriers are dedicated for either DL or UL transmissions. In some other instances, the 5G NR frame structure may be TDD in which, for a particular set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 milliseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP- OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and $2^\mu$ slots per subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz, and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 microseconds (p).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRSs). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
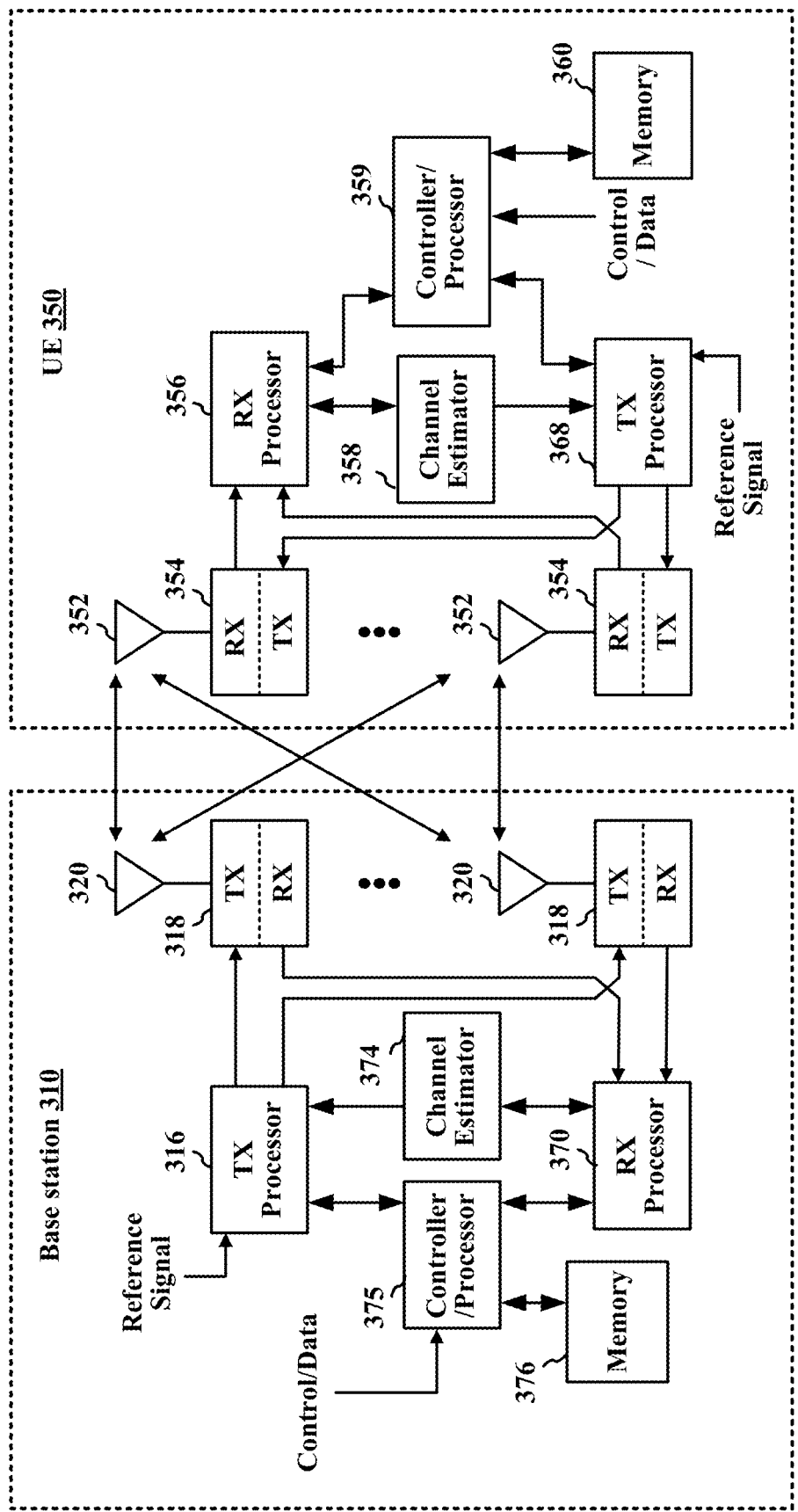
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer-3 and layer-2 functionality. Layer-3 includes a radio resource control (RRC) layer, and layer-2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer-3 and layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

The memory 360 may include random access memory (RAM) and read only memory (ROM). The memory 360 may store computer-readable, computer-executable software/firmware code including instructions that, when executed, cause the processor 359 to perform various functions described herein (e.g., early UE capability retrieval, etc.), including the functions described with reference to the UE truncating manger 815. Alternatively, the software/firmware code may not be directly executable by the processor 359 but cause a computer (e.g., when compiled and executed) to perform functions described herein. The processor 359 may include an intelligent hardware device, (e.g., a central processing unit (CPU), a microcontroller, an application specific integrated circuit (ASIC), etc.).

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

The memory 376 may include random access memory (RAM) and read only memory (ROM). The memory 376 may store computer-readable, computer-executable software/firmware code including instructions that, when executed, cause the processor 375 to perform various functions described herein (e.g., early UE capability retrieval, etc.), including the functions described with reference to the base station coding manger 915. Alternatively, the software/firmware code may not be directly executable by the processor 375 but cause a computer (e.g., when compiled and executed) to perform functions described herein. The processor 375 may include an intelligent hardware device, (e.g., a central processing unit (CPU), a microcontroller, an application specific integrated circuit (ASIC), etc.).

In the example of FIG. 3, each antenna 352 of the UE 350 is coupled to a respective transmitter 354TX. However, in some other implementations, the UE 350 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

Figure 4:
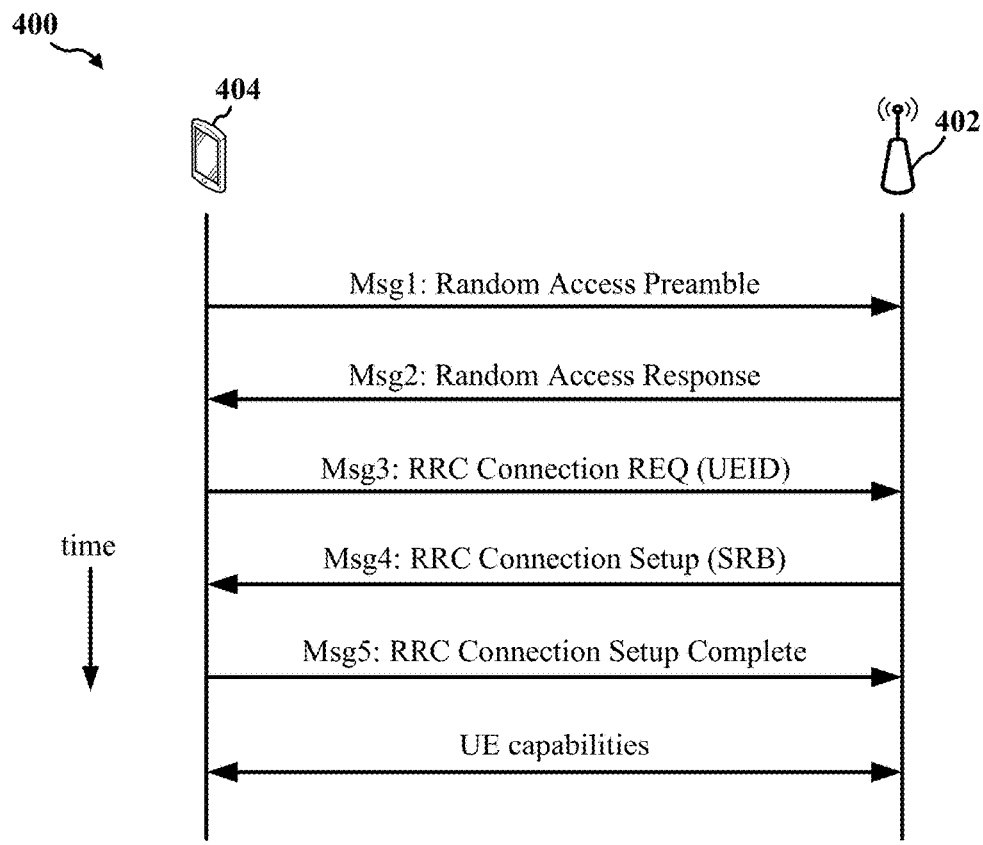
FIG. 4 shows a sequence diagram for wireless communication that supports an RRC connection procedure.

FIG. 4 shows a sequence diagram depicting an example message exchange 400 that supports establishing an RRC connection between a base station 402 and a UE 404. The base station 402 may be one example of the base station 102 of FIG. 1 or the base station 310 of FIG. 3, and the UE 404 may be one example of the UE 104 of FIG. 1 or the UE 350 of FIG. 3. The UE 404 may use a random access procedure to establish a layer-1 (physical layer) and layer-2 (MAC layer) connection with the base station 402, and then use an RRC procedure to establish a layer-3 connection (such as an RRC connection) with the base station 402.

The UE 404 may transmit a random access preamble (Msg1) to the base station 402 on a random access channel (RACH) of a radio access network. The random access preamble may be transmitted with a selected preamble sequence using a transmission power on an indicated RACH resource. The base station 402 receives the random access preamble in Msg1, and transmits a random access response (Msg2) to the UE 404. When the random access response contains a random access preamble identifier that matches the preamble sequence of the random access preamble, the UE 404 may stop monitoring the RACH, and may initiate an RRC connection establishment procedure.

The UE 404 may transmit an RRC connection request (Msg3) to the base station 402. The RRC connection request may contain a UE identity (UEID) that uniquely identifies the UE 404. The UE identity may indicate a core network entity that stores the UE's context (such as the UE's capabilities and Inter-UE QoS information). In some instances, the UE identity may indicate a particular AMF (such as the AMF 192 of FIG. 1) that stores the UE's context, and can be used by the base station 402 to retrieve capability information of the UE 404 from the particular AMF.

The base station 402 receives Msg3, and may use the UE identity to identify the core network entity that stores the UE's context. The base station 402 may retrieve the UE's context from the identified core network entity, and may use the UE's radio capability information to determine an initial signaling radio bearer (SRB1) configuration for the UE 404.

The base station 402 may transmit the SRB1 configuration to the UE 404 in an RRC connection setup message (Msg4). The UE 404 receives Msg4, determines its SRB1 configuration, and transmits an RRC connection setup complete message (Msg5) to the base station 402. Reception of Msg5 by the base station 402 may conclude the RRC connection establishment procedure.

In some instances, the number of bits available for transmitting UE identity information in a given RRC message may be less than the number of bits in the UE identity, and thus the UE may not be able to transmit the entire UE identity to the base station 402 in the RRC connection request (Msg3). For example, physical layer transport block size constraints may prevent eMTC devices from embedding more than 40 bits of an identifier in a given RRC message, and thus eMTC devices may not be able to transmit the entirety of a 48-bit UE identity to the base station 402 in the RRC connection request (Msg3).

An RRC connection request for a base station associated with a 5G core network typically includes a 48-bit 5G-S-TMSI as the UE identity. The 5G-S-TMSI includes a 10-bit AMF Set ID, a 6-bit AMF pointer, and a 32-bit 5G-TMSI. UEs such as eMTC devices that are not capable of sending the entire 48-bit 5G-S-TMSI in a given RRC message typically send the 40 least significant bits (LSBs) of the 5G-S-TMSI in the RRC connection request (Msg3), and then send the remaining 8 bits of the 5G-S-TMSI to the base station 402 in the RRC connection setup complete message (Msg5). However, the 8 most significant bits (MSBs) of the 5G-S-TMSI correspond to the 8-bit AMF set ID, which is necessary for the base station 402 to determine which AMF stores the UE context. As a result, the base station 402 may not be able to identify the AMF and retrieve the UE capabilities until reception of Msg5, and therefore typically configures SRB1 for the UE 404 before determining the UE's capabilities.

Selecting a SRB1 configuration without knowing the UE's capabilities may limit the base station's ability to tailor or optimize the SRB1 configuration for a UE. This may be particularly problematic for cellular IoT (CIoT) devices (such as eMTC or NB-IoT devices), using control plane optimization for small data transmission, having various capabilities for different radio enhancements. Thus, it is desirable for the base station 402 to obtain the UE radio capabilities of such devices before selecting and transmitting the SRB1 configuration in the RRC connection setup message (Msg4).

In accordance with various aspects of the present disclosure, a UE may truncate or remove a number of bits from its UE identity based on identity truncating information to generate a truncated UE identity. The truncated UE identity can be transmitted by eMTC devices to a base station in an RRC connection request, and can be used by the base station to determine which core network entity (such as an AMF) stores the UE's capabilities. In some implementations, the UE may truncate or remove a number of bits from the 48-bit 5G-S-TMSI based on the identity truncating information to generate a 40-bit truncated 5G-S-TMSI that can be transmitted by an eMTC device to the base station in the RRC connection request and yet still provide the base station with enough information to determine which AMF stores the UE context. This allows the base station to retrieve the UE capabilities from the AMF before selecting the SRB configuration for the UE. In this manner, the base station can select or determine the SRB configuration for UEs based on their capabilities, even for UEs such as eMTC devices that may not be capable of transmitting the 48-bit 5G-S-TMSI in an RRC message.

Figure 5:
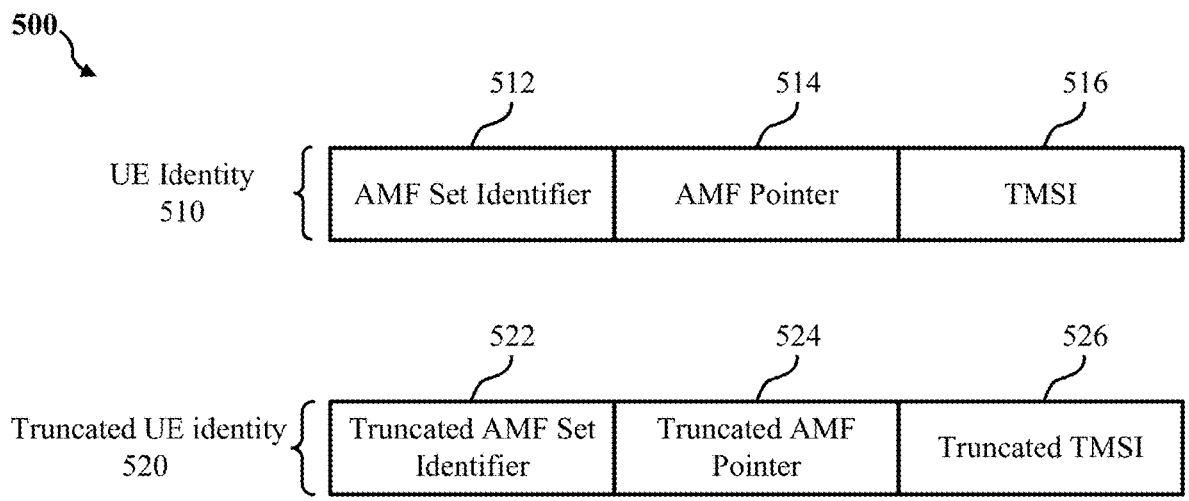
FIG. 5 shows example fields of a UE identity and truncated UE identity.

FIG. 5 shows an example UE identity 510 and an example truncated UE identity 520. The UE identity 510, which in some instances may be a 48-bit 5G-S-TMSI, includes an AMF set identifier 512, an AMF pointer 514, and a TSMI 516. The AMF set identifier 512 may uniquely identify an AMF set within an AMF region, the AMF pointer 514 may identify one or more AMFs within the AMF set, and the TMSI 516 may uniquely identify a particular UE. The truncated UE identity 520, which includes a truncated AMF set identifier 522, a truncated AMF pointer 524, and a truncated TMSI 526, may be generated by removing a number of bits from one or more of the AMF set identifier 512, the AMF pointer 514, or the TSMI 516 of the UE identity 510 based on the identity truncating information.

In some network implementations, there may be a fewer number of AMF sets within a given AMF region that can be uniquely identified by the AMF set identifier 512, and therefore one or more MSBs of the AMF set identifier 512 may be the same for a plurality of different AMF sets. Similarly, there may be a fewer number of AMFs within a given AMF set that can be uniquely identified by the AMF pointer 514, and therefore one or more MSBs of the AMF pointer 514 may be the same for a plurality of different AMFs. In other words, the number of MSBs of the AMF set identifier 512 that are common to all AMF sets within a given AMF region are not used to uniquely identify the AMF sets within the given AMF region, and therefore may be removed or truncated from the UE identity 510 to generate the truncated UE identity 520. Similarly, the number of MSBs of the AMF pointer 514 that are common to all AMFs within a given AMF set are not used to uniquely identify the AMFs within the given AMF set, and therefore may be removed or truncated from the UE identity 510 to generate the truncated UE identity 520.

The number of LSBs of the AMF set identifier 512 that are not common to the AMF sets within a given AMF region may uniquely identify the AMF sets, and therefore may be retained when generating the truncated UE identity 520. Similarly, the number of LSBs of the AMF pointer 514 that are not common to the AMFs within a given AMF set may uniquely identify the AMFs within the given AMF set, and therefore may be retained when generating the truncated UE identity 520. In some implementations, the identity truncating information may indicate a first number n of LSBs of the AMF set identifier 512 to be retained when generating the truncated UE identity 520, and indicate a second number m of LSBs of the AMF pointer 514 to be retained when generating the truncated UE identity 520. In some aspects, the truncated AMF set identifier 522 may be generated by retaining the n LSBs of the AMF set identifier 512 (and removing the remaining MSBs of the AMF set identifier 512), and the truncated AMF pointer 524 may be generated by retaining the m LSBs of the AMF pointer 514 (and removing the remaining MSBs of the AMF pointer 514).

In some implementations, the first and second numbers n and m may also be used to determine the number M of LSBs of the TMSI 516 to be retained when generating the truncated UE identity 520. The number M may be expressed as M=N-n-m, where N is the number of bits in the truncated UE identity 520. In some aspects, the truncated TMSI 526 may be generated by retaining only the N-n-m LSBs of the TMSI 516. For example, in instances for which the truncated UE identity 520 contains 40 bits, the number of common MSBs of the AMF set identifier 512 is 6 bits, and the number of common MSBs of the AMF pointer 514 is 4, the truncated AMF set identifier 522 may be generated by retaining only the n=6 LSBs of the AMF set identifier 512, the truncated AMF pointer 524 may be generated by retaining only the m=4 LSBs of the AMF pointer 514, and the truncated TMSI 526 may be generated by retaining only the 40-6-4 LSBs of the TMSI 516. In some other implementations, the identity truncating information may expressly indicate the number of LSBs of the TMSI 516 to retain when generating the truncated UE identity 520. For example, the identity truncating information may also include a value z indicating the number of LSBs of the TMSI 516 to retain when generating the truncated UE identity 520.

Figure 6:
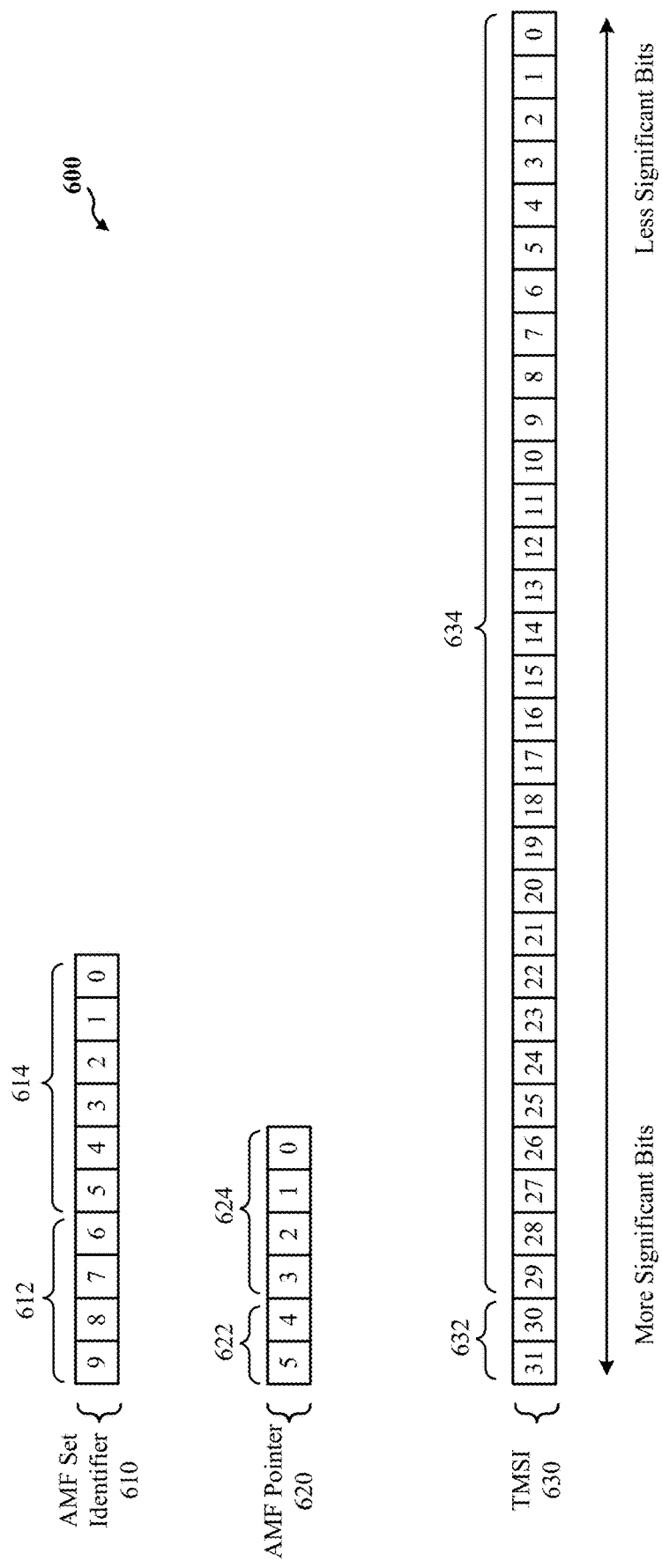
FIG. 6 depicts the generation of an example truncated UE identity.

FIG. 6 depicts the generation of an example truncated UE identity by truncating certain bits of a UE identity and retaining certain other bits of the UE identity. As shown, the UE identity includes a 10-bit AMF set identifier 610, a 6-bit AMF pointer 620, and a TSMI 630. A truncated AMF set identifier may be generated by truncating a number or subset 612 of MSBs of the AMF set identifier 610, and thus retaining only a number or subset 614 of LSBs of the AMF set identifier 610. Similarly, a truncated AMF pointer may be generated by truncating a number or subset 622 of MSBs of the AMF pointer 620, and thus retaining only a number or subset 624 of LSBs of the AMF pointer 620. A truncated TMSI may be generated by truncating a number or subset 632 of MSBs of the TMSI 630, and thus retaining only a number or subset 634 of LSBs of the TMSI 630.

In some implementations, the value of n may be equal to or less than the total length of the AMF set identifier 610, and the value of m may be equal to or less than the total length of the AMF pointer 620. For example, n may be no larger than 10 and m may be no larger than 6. The total of n+m+z may be equivalent to the number of bits allocated for transmitting the identification indicator (e.g., 40 bits).

A UE may receive the identity truncating information, and may generate the truncated UE identity by removing a number of bits one or more fields of the UE identity according to the values contained in the identity truncating information. For the example of FIG. 6, the identity truncating information may indicate 6, 4, and 30 as the values of n, m, and z, respectively. For example, the UE may remove the 4 MSBs 612 from the AMF set identifier 610, may remove the 2 MSBs 622 from the AMF pointer 620, and may remove the 2 MSBs from the TMSI 630 to generate the truncated UE identity.

Figure 7A:
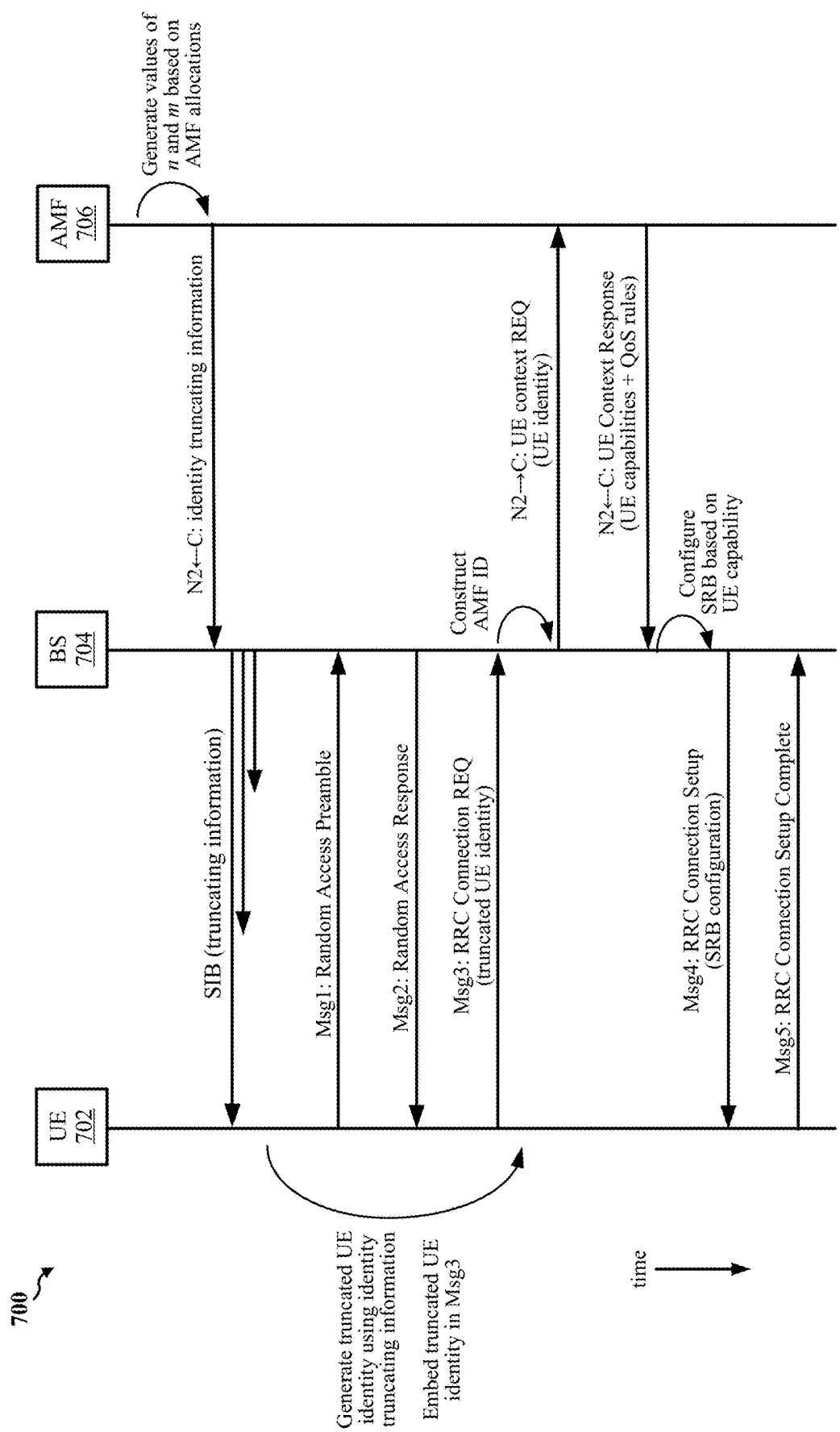
FIG. 7A shows a sequence diagram for wireless communication that supports early retrieval of UE capabilities.

FIG. 7A shows a sequence diagram 700 for wireless communication between a base station 704, a UE 702, and an AMF 706 that supports early retrieval of UE capabilities in an access network. The base station 704 may be one example of the base station 102 of FIG. 1, the base station 310 of FIG. 3, or the base station 402 of FIG. 4. The UE 702 may be one example of the UE 104 of FIG. 1, the UE 350 of FIG. 3, or the UE 404 of FIG. 4. In some implementations, the AMF 706 may be one example of the AMF 192 of FIG. 1. In some other implementations, the AMF 706 may be any suitable network entity or network function that can establish a connection between the UE 702 and a core network (not shown for simplicity).

In some implementations, the UE 702 may be an enhanced machine type communications (eMTC) device capable of embedding no more than 40 bits of an identify in RRC messages, and the core network associated with the AMF 706 may be a 5G core network that uses the 48-bit 5G-S-TMSI to uniquely identify UEs and their corresponding AMFs. In some aspects, the UE 702 may generate a 40-bit truncated UE identity from the 48-bit 5G-S-TMSI such that the truncated UE identity can be transmitted to the base station 704 in a single RRC message and can be used by the base station to identify the AMF that store capability and other information of UE.

For the example of FIG. 7A, the AMF 706 stores the UE context for the UE 702, and may determine or obtain the values of n and m based on the number of AMF sets allocated to an associated AMF region and on the number of AMFs allocated to an associated AMF set. The AMF 706 may provide identity truncating information containing the values of n and m to the base station 704 via the N2 connection between the base station 704 and a core network associated with the AMF 706. The base station 704 may broadcast the identity truncating information in one or more SIBs for reception by UE's within a coverage area of the base station 704.

The UE 702 receives the identity truncating information, and may use the identity truncating information to generate the truncated UE identity, for example, by truncating one or more fields of the UE identity. In some implementations, the identity truncating information includes the first value n indicating the number of LSBs of the AMF set identifier portion of the UE identity to retain when generating the truncated UE identity, and includes the second value m indicating the number of LSBs of the AMF pointer portion of the UE identity to retain when generating the truncated UE identity.

The UE 702 may establish an access stratum connection with the base station 704 using a random access procedure. In some aspects, the UE transmits a random access preamble (Msg1) to the base station 704. The random access preamble may be transmitted on a random access channel (RACH), and may include selected preamble sequence. The base station 704 receives the random access preamble in Msg1, and transmits a random access response (Msg2) to the UE 702. The random access response contains a random access preamble identifier that matches the preamble sequence of the random access preamble, and the UE 702 may initiate an RRC connection procedure by transmitting an RRC connection request (Msg3) to the base station 704.

The RRC connection request (Msg3) contains the truncated UE identity generated according to the identity truncating information. In some aspects, the truncated UE identity contains 40 bits, and may be embedded within the RRC connection request (Msg3) by eMTC devices. The base station 704 receives the truncated UE identity in Msg3, and constructs an AMF identifier based at least in part on the truncated UE identity.

In some implementations, the base station 704 obtains the identity truncating information from the AMF 706, and uses the values n and m to reconstruct the 5G-S-TMSI (or at least portions of the 5G-S-TMSI from which the base station 704 can identify the AMF that stores capability information for the UE 702. In some aspects, construction of the AMF set identifier may be based on a number of MSBs of the AMF set identifier and the AMF pointer. In other aspects, construction of the AMF set identifier may be based on the LSBs of the AMF set identifier and the AMF pointer.

The base station 704 sends a request for the UE's context to the identified AMF 706 via the N2 connection. The AMF 706 responds by sending the UE context to the base station 704 via the N2 connection. In some implementations, the UE context includes at least the UE capabilities and Inter-UE QoS information. The base station 704 uses the UE capabilities to select or determine the SRB1 configuration for the UE 702, for example, so that the SRB configuration can be tailored or optimized based on the specific capabilities and/or constraints of the UE 702.

The base station 704 transmits the SRB1 configuration to the UE 702 in an RRC connection setup message (Msg4). The UE 702 receives Msg4, determines its SRB1 configuration, and transmits an RRC connection setup complete message (Msg5) to the base station 704. Reception of Msg5 by the base station 704 may conclude the RRC connection establishment procedure.

Figure 7B:
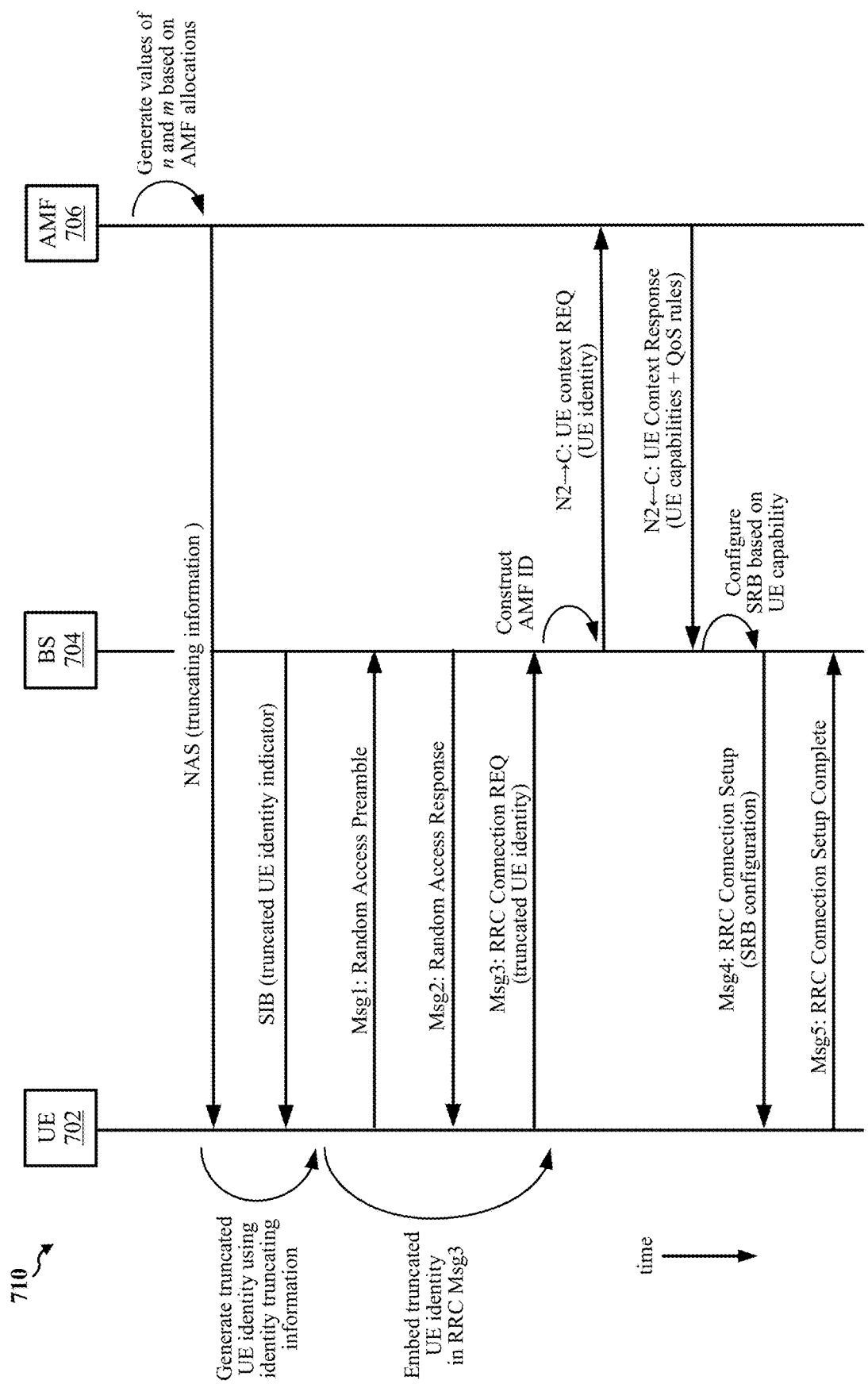
FIG. 7B shows another sequence diagram for wireless communication that supports early retrieval of UE capabilities.

FIG. 7B shows a sequence diagram 710 for wireless communication between a base station 704, a UE 702, and an AMF 706 that supports early retrieval of UE capabilities in an access network. The base station 704 may be one example of the base station 102 of FIG. 1, the base station 310 of FIG. 3, or the base station 402 of FIG. 4. The UE 702 may be one example of the UE 104 of FIG. 1, the UE 350 of FIG. 3, or the UE 404 of FIG. 4. In some implementations, the AMF 706 may be one example of the AMF 192 of FIG. 1. In some other implementations, the AMF 706 may be any suitable network entity or network function that can establish a connection between the UE 702 and a core network (not shown for simplicity).

The sequence diagram 710 is similar to the sequence diagram 700 of FIG. 7B in some aspects, and differs from the sequence diagram 700 of FIG. 7B in other aspects. One difference is that in sequence diagram 710, the UE 702 receives the identity truncating information from the AMF 706 via NAS signaling. In some implementations, the UE 702 may transmit a NAS registration request message to the AMF 706, and the AMF 706 may respond by sending a NAS registration accept message containing the identity truncating information. The base station 704 may broadcast one or more SIBs containing an indicator for the UE 702 to embed the 40-bit truncated UE identity in the RRC connection request (Msg3), for example, rather than a portion of the 48-bit 5G-S-TMSI.

Figure 8:
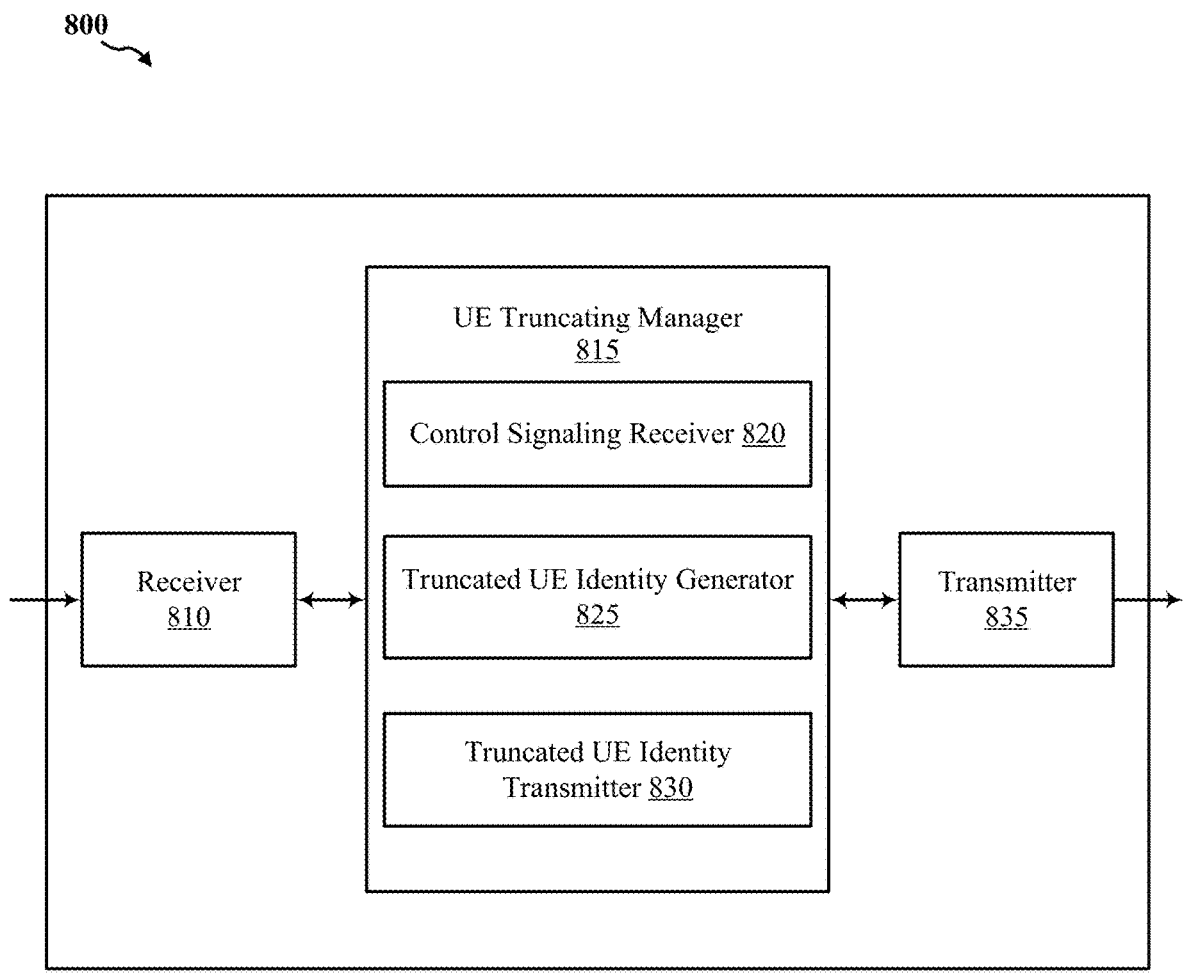
FIG. 8 shows a diagram illustrating an example UE that supports truncated UE identities.

FIG. 8 shows a block diagram of UE 800 (which may be referred to as device 800) that supports truncated UE identities in accordance with aspects of the present disclosure. The UE 800 may be one example of the UE 104 of FIG. 1, the UE 350 of FIG. 3, the UE 404 of FIG. 4, or the UE 702 of FIGS. 7A-7B. The device 800 may include a receiver 810, a UE truncating manager 815, and a transmitter 835. The device 800 may also include a processor. Each of these components may be in communication with one another (e.g., via one or more buses).

The receiver 810 may receive information such as packets, user data, or control information associated with various information channels (e.g., control channels, data channels, and information related to truncated identification indicators, etc.). Information may be passed on to other components of the device 800. The receiver 810 may utilize a single antenna or a set of antennas.

The UE truncating manager 815 may include a control signaling receiver 820, a truncated UE identity generator 825, and a truncated UE identity transmitter 830. The control signaling receiver 820 may receive control signaling indicating identity truncating information for truncating one or more fields of a UE identity to generate a truncated UE identity. The truncated UE identity generator 825 may generate the truncated UE identity according to the identity truncating information. The truncated UE identity transmitter 830 may transmit the truncated UE identity to a base station.

The actions performed by the UE truncating manager 815 as described herein may be implemented to realize one or more potential advantages. Using truncated UE identities may allow a base station 102 to retrieve UE capabilities after a Msg 3 reception in a RACH procedure and optimally provide a SRB configuration to a UE 104 using the retrieved UE capabilities in a Msg 4. This technique may allow a UE 104 to provide improved quality and reliability of service at the UE 115 as latency may be reduced due to the UE being identified prior to the RRC connection setup complete message. Other benefits may include efficient radio transmissions, reduced UE power transmission, etc.

The transmitter 835 may transmit signals generated by other components of the device 800. In some instances, the transmitter 835 may be collocated with a receiver 810 in a transceiver module. The transmitter 835 may utilize a single antenna or a set of antennas.

Figure 9:
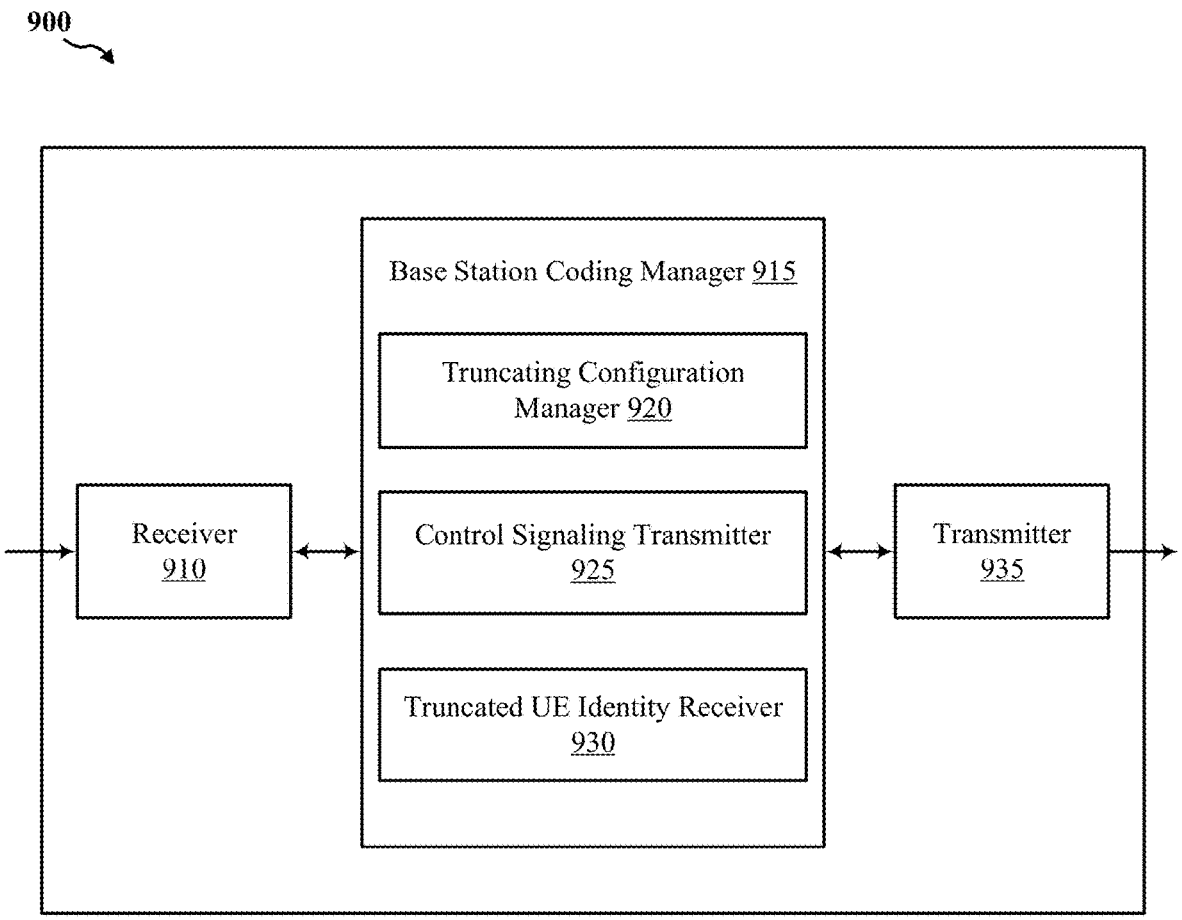
FIG. 9 shows a diagram illustrating an example base station that supports truncated UE identities.

FIG. 9 shows a block diagram of a base station 900 that supports truncated UE identities in accordance with aspects of the present disclosure. The base station 900 may be one example of the base station 102 of FIG. 1, the base station 310 of FIG. 3, the base station 402 of FIG. 4, or the base station 704 of FIGS. 7A-7B. The base station 900 include a receiver 910, a base station coding manager 915, and a transmitter 935. Although not shown for simplicity, the base station 900 may also include one or more processors and other suitable components, for example, as described with reference to FIG. 3. Each of these components may be in communication with one another (e.g., via one or more buses).

The receiver 910 may utilize any number of antennas or sets of antennas, and may receive information such as packets, user data, or control information associated with various information channels (e.g., control channels, data channels, and information related to truncated identification indicators, etc.). Information received via the one or more antennas may be passed on to other components of the base station 900. The receiver 910 may be an example of aspects of the receiver described with reference to FIG. 3.

The base station coding manager 915 may determine identity truncating information for generating a truncated UE identity. In some implementations, the base station coding manager 915 may include a truncating configuration manager 920, a control signaling transmitter 925, and a truncated UE identity receiver 930. The truncating configuration manager 920 may determine the identity truncating information for truncating one or more fields of the UE identity. The control signaling transmitter 925 may transmit control signaling indicating the identity truncating information. The truncated UE identity receiver 930 may receive a truncated UE identity generated according to the identity truncating information.

The actions performed by the base station coding manager 915 as described herein may be implemented to realize one or more potential advantages. Using truncated UE identities may allow a base station 102 to retrieve UE capabilities after a Msg 3 reception in a RACH procedure and optimally provide a SRB configuration to a UE 104 using the retrieved UE capabilities in a Msg 4. This technique may allow a base station 102 to provide improved quality and reliability of service at the base station 102 as latency may be reduced due to the UE being identified prior to the RRC connection setup complete message. Other benefits may include efficient radio transmissions, reduced UE power transmission, etc.

The base station coding manager 915, or its sub-components, may be implemented in hardware, code (e.g., software or firmware) executed by a processor, or any combination thereof. If implemented in code executed by a processor, the functions of the base station coding manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station coding manager 915, or its sub-components, may be physically located at various positions, including being distributed such that portions of functions are implemented at different physical locations by one or more physical components. In some examples, the base station coding manager 915, or its sub-components, may be a separate and distinct component in accordance with various aspects of the present disclosure. In some examples, the base station coding manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 935 may utilize any number of antennas or sets of antennas, may transmit signals generated by other components of the base station 900 to other wireless communication devices, network entities, and the like. In some instances, the transmitter 935 may be collocated with a receiver 910 in a transceiver module.

Figure 10A:
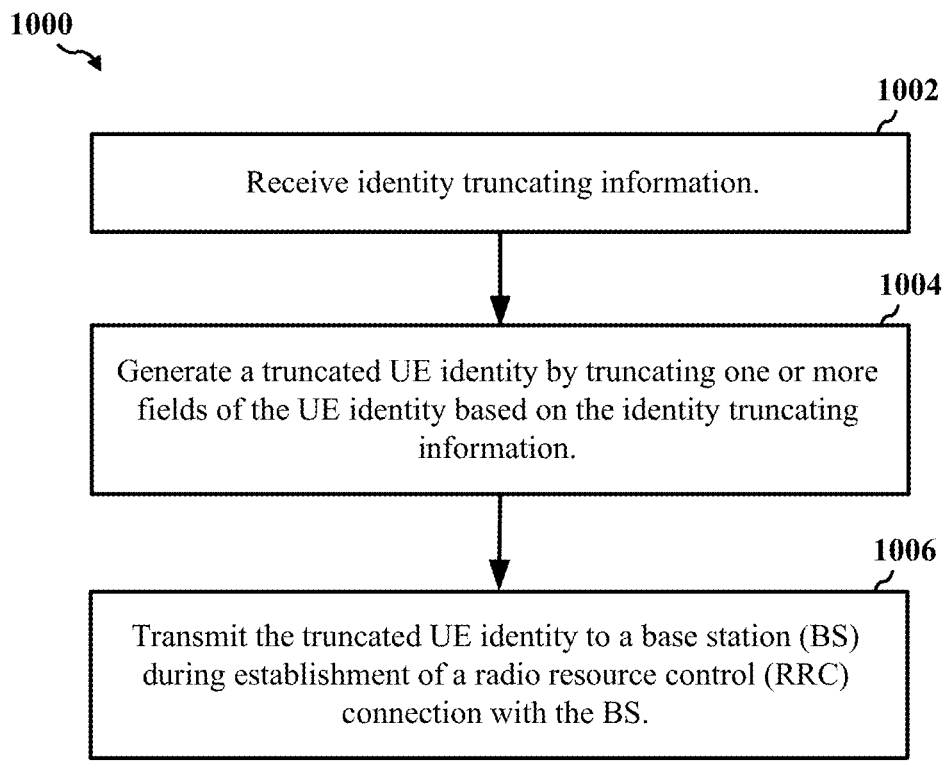
FIGS. 10A-10C show flowcharts depicting example operations for wireless communication that supports early retrieval of UE capabilities.

FIG. 10A shows a flowchart depicting an example operation 1000 for wireless communication that supports early retrieval of UE capabilities. The operation 1000 may be performed by a wireless communication device such as the UE 104 of FIG. 1, the UE 350 of FIG. 3, the UE 404 of FIG. 4, the UE 702 of FIGS. 7A-7B, or the UE 800 of FIG. 8. Although described with reference to the BS 704, the UE 702, and the AMF 706 of FIGS. 7A-7B, the example operation 1000 may be performed in conjunction with other suitable base stations, access nodes, TRPs, network functions, or network entities.

At block 1002, the UE receives identity truncating information. In some implementations, the UE may receive the identity truncating information from the BS 704. In some instances, the BS 704 may include the identity truncating information in one or more broadcasted SIBs, and the UE may receive at least one of the SIBs and obtain the identity truncating information. In other implementations, the UE may receive the identity truncating information from the AMF 706, which may be part of a core network (such as a 5G core network). In some instances, the UE may transmit a NAS registration request message to the AMF 706, and the AMF 706 may respond by sending a NAS registration accept message, to the UE, that contains the identity truncating information (such as the first and second values n and m). Additionally, the UE may receive an indication to use its truncated UE identity (rather than its initial or original UE identity) when establishing a connection with the BS 704. In some instances, the UE may receive the indication in one or more SIBs broadcasted by the BS 704.

At block 1004, the UE generates a truncated UE identity by truncating one or more fields of the UE identity based on the identity truncating information. In some implementations, the UE may generate the truncated UE identity by retaining only the n LSBs of the AMF set identifier of the UE identity, retaining only the m LSBs of the AMF pointer of the UE identity, and retaining only the (L−n−m) LSBs of the 5G-TMSI of the UE identity, where L indicates the number of bits in the truncated UE identity.

At block 1006, the UE transmits the truncated UE identity to the BS during establishment of an RRC connection with the BS. In some implementations, the truncated UE identity may be transmitted in an RRC connection request message. In some instances, the UE is an eMTC device, the truncated UE identity consists of 40 bits, and the UE identity is a 48-bit 5G-S-TMSI.

Figure 10B:
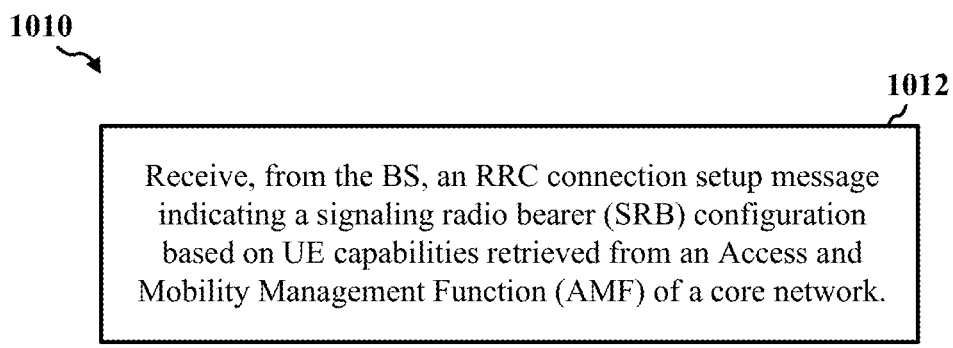

FIG. 10B shows a flowchart depicting an example operation 1010 for wireless communication that supports early retrieval of UE capabilities. The operation 1010 may be performed by a wireless communication device such as the UE 104 of FIG. 1, the UE 350 of FIG. 3, the UE 404 of FIG. 4, the UE 702 of FIGS. 7A-7B, or the UE 800 of FIG. 8. Although described with reference to the BS 704, the UE 702, and the AMF 706 of FIGS. 7A-7B, the example operation 1010 may be performed in conjunction with other suitable base stations, access nodes, TRPs, network functions, or network entities. In some implementations, the operation 1010 may be performed after the UE transmits the truncated UE identity in block 1006 of the operation 1000 of FIG. 10A.

At block 1012, the UE receives, from the BS, an RRC connection setup message indicating a SRB configuration based on UE capabilities retrieved from an AMF of a core network. In some implementations, the identity truncating information indicates a number of least significant bits (LSBs) of at least one field of the one or more fields of the UE identity to retain during generation of the truncated UE identity.

Figure 10C:
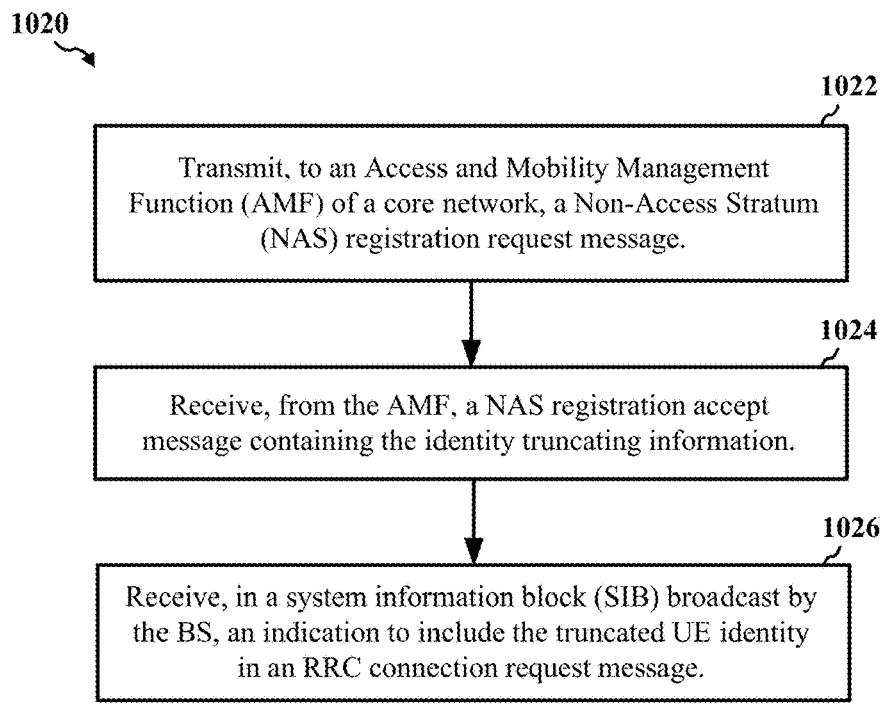

FIG. 10C shows a flowchart depicting an example operation 1020 for wireless communication that supports early retrieval of UE capabilities. The operation 1020 may be performed by a wireless communication device such as the UE 104 of FIG. 1, the UE 350 of FIG. 3, the UE 404 of FIG. 4, the UE 702 of FIGS. 7A-7B, or the UE 800 of FIG. 8. Although described with reference to the BS 704, the UE 702, and the AMF 706 of FIGS. 7A-7B, the example operation 1020 may be performed in conjunction with other suitable base stations, access nodes, TRPs, network functions, or network entities. In some implementations, the operation 1010 may be one example of receiving the truncated UE identity in block 1002 of the operation 1000 of FIG. 10A.

At block 1022, the UE transmits, to an Access and Mobility Management Function (AMF) of a core network, a Non-Access Stratum (NAS) registration request message. In some implementations, the AMF may determine the identity truncating information as described herein.

At block 1024, the UE receives, from the AMF, a NAS registration accept message containing the identity truncating information.

At block 1026, the UE receives, in a system information block (SIB) broadcast by the BS, an indication to include the truncated UE identity in an RRC connection request message.

Figure 11A:
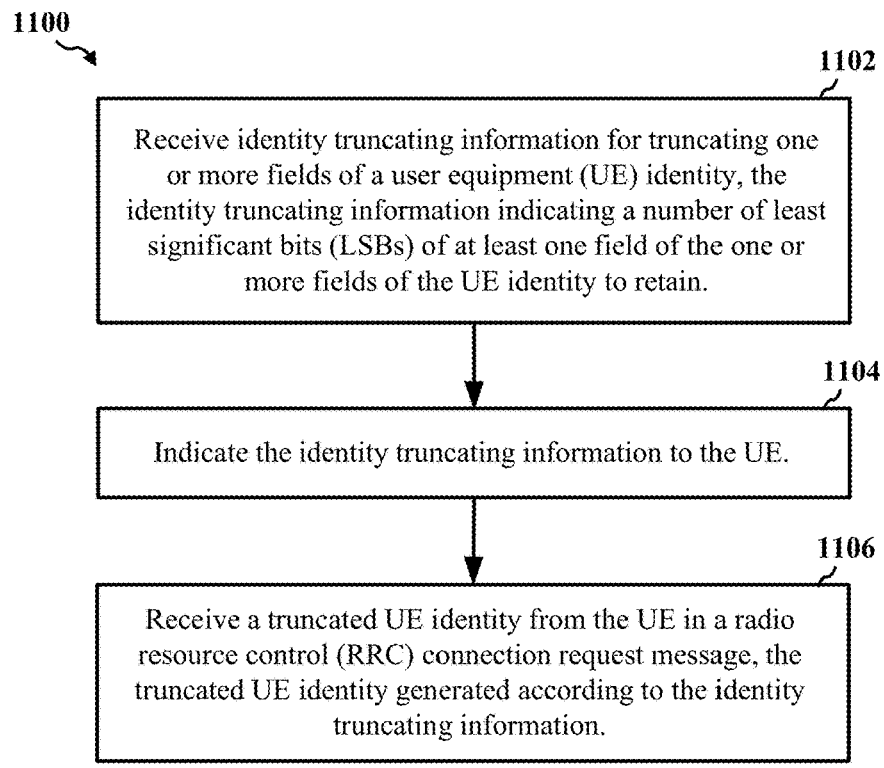
FIGS. 11A-11C show flowcharts depicting example operations for wireless communication that supports early retrieval of UE capabilities.

FIG. 11A shows a flowchart depicting an example operation 1100 for wireless communication that supports early retrieval of UE capabilities. The operation 1100 may be performed by a wireless communication device such as the BS 102 of FIG. 1, the BS 310 of FIG. 3, the BS 402 of FIG. 4, the BS 704 of FIG. 7A, or the BS 900 of FIG. 9. Although described with reference to the BS 704, the UE 702, and the AMF 706 of FIG. 7A, the example operation 1100 may be performed in conjunction with other suitable base stations, access nodes, TRPs, network functions, or network entities.

At block 1102, the BS receives identity truncating information for truncating one or more fields of a user equipment (UE) identity, the identity truncating information indicating a number of least significant bits (LSBs) of at least one field of the one or more fields of the UE identity to retain.

At block 1104, the BS indicates the identity truncating information to the UE. In some implementations, the identity truncating information may be contained in one or more SIBs broadcast by the BS.

At block 1106, the BS receives a truncated UE identity from the UE in a radio resource control (RRC) connection request message, the truncated UE identity generated according to the identity truncating information. In some implementations, the truncated UE identity is generated by retaining only the n LSBs of the AMF set identifier of the UE identity, retaining only the m LSBs of the AMF pointer of the UE identity, and retaining only the (L−n−m) LSBs of the 5G-TMSI of the UE identity, where L indicates the number of bits in the truncated UE identity. In some instances, the UE is an eMTC device, the UE identity includes 48 bits, and the truncated UE identity consists of 40 bits.

Figure 11B:
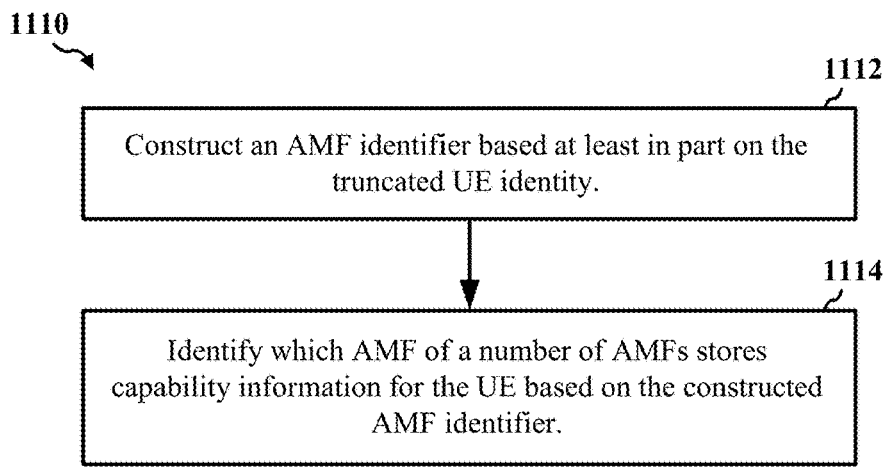

FIG. 11B shows a flowchart depicting an example operation 1110 for wireless communication that supports early retrieval of UE capabilities. The operation 1110 may be performed by a wireless communication device such as the BS 102 of FIG. 1, the BS 310 of FIG. 3, the BS 402 of FIG. 4, the BS 704 of FIG. 7A, or the BS 900 of FIG. 9. Although described with reference to the BS 704, the UE 702, and the AMF 706 of FIG. 7A, the example operation 1100 may be performed in conjunction with other suitable base stations, access nodes, TRPs, network functions, or network entities. In some implementations, the operation 1110 may be performed after receiving the truncated UE identity in block 1106 of the operation 1100 of FIG. 11A.

At block 1112, the BS constructs an AMF identifier based at least in part on the truncated UE identity.

At block 1114, the BS identifies which AMF of a number of AMFs stores capability information for the UE based on the constructed AMF identifier.

Figure 11C:
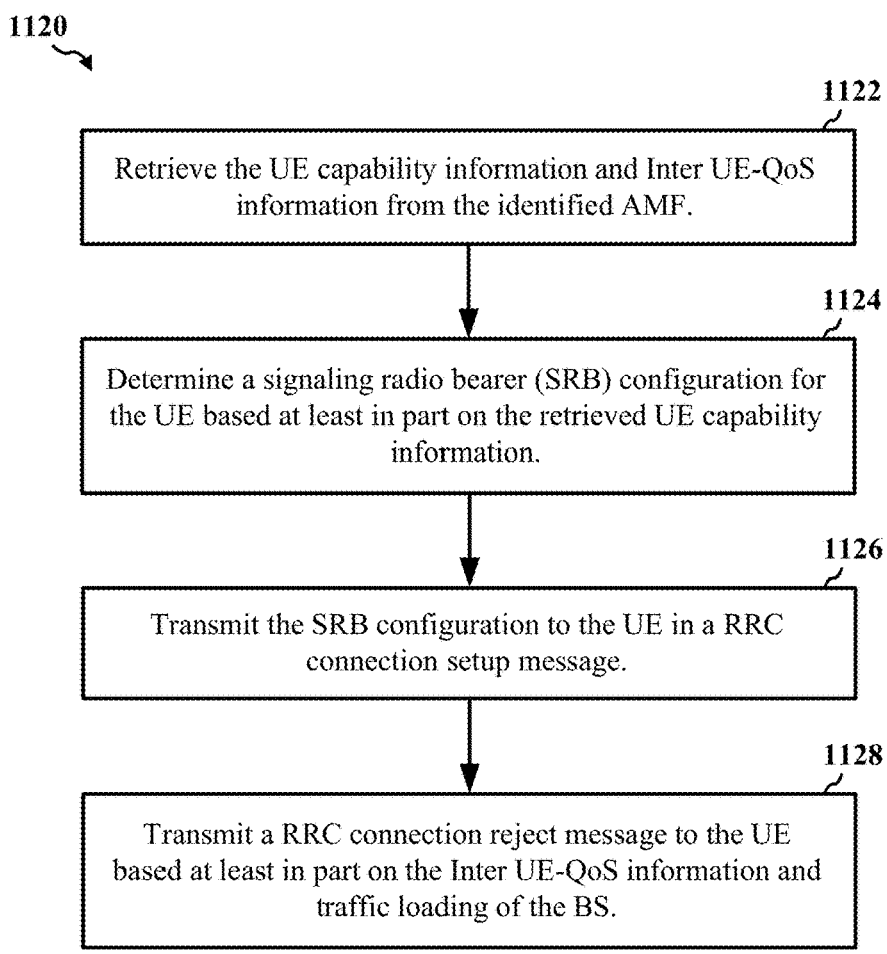

FIG. 11C shows a flowchart depicting an example operation 1120 for wireless communication that supports early retrieval of UE capabilities. The operation 1120 may be performed by a wireless communication device such as the BS 102 of FIG. 1, the BS 310 of FIG. 3, the BS 402 of FIG. 4, the BS 704 of FIG. 7A, or the BS 900 of FIG. 9. Although described with reference to the BS 704, the UE 702, and the AMF 706 of FIG. 7A, the example operation 1120 may be performed in conjunction with other suitable base stations, access nodes, TRPs, network functions, or network entities. In some implementations, the operation 1120 may be performed after identifying the AMF in block 1114 of the operation 1110 of FIG. 11B.

At block 1122, the BS retrieves the UE capability information and Inter-UE QoS information from the identified AMF.

At block 1124, the BS determines a signaling radio bearer (SRB) configuration for the UE based at least in part on the retrieved UE capability information.

At block 1126, the BS transmits the SRB configuration to the UE in an RRC connection setup message.

At block 1128, the BS transmits an RRC connection reject message to the UE based at least in part on the Inter-UE QoS information and traffic loading of the BS.

Figure 12A:
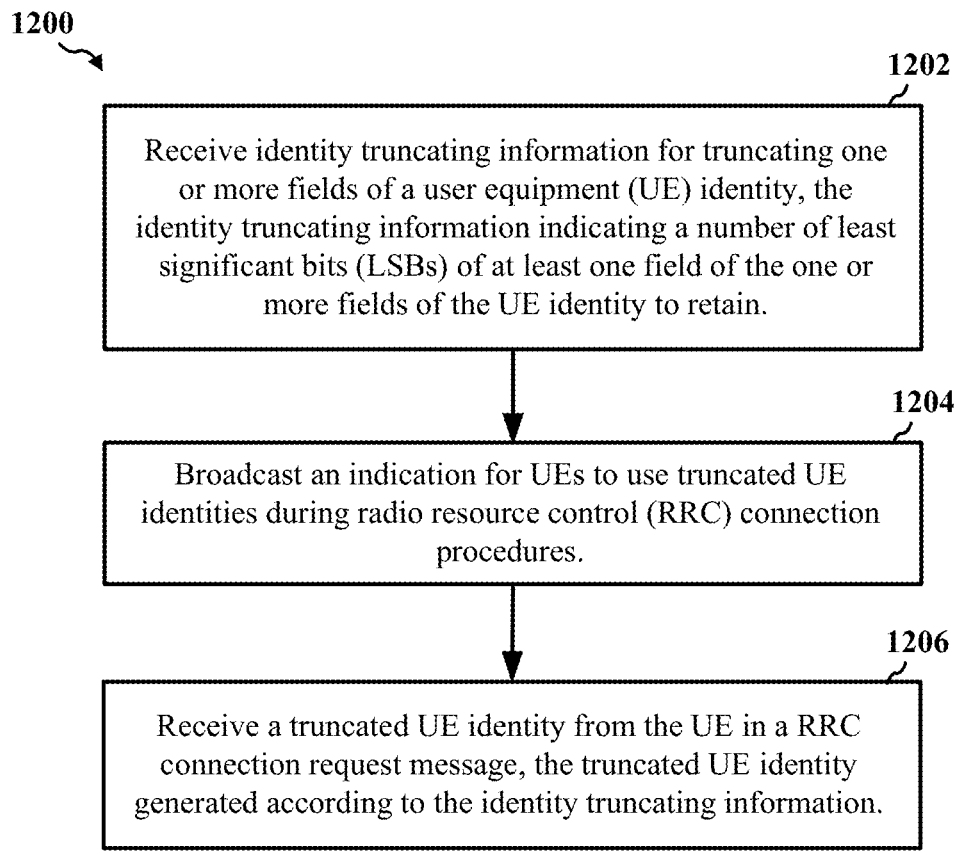
FIGS. 12A-12C show flowcharts depicting example operations for wireless communication that supports early retrieval of UE capabilities.

FIG. 12A shows a flowchart depicting an example operation 1200 for wireless communication that supports early retrieval of UE capabilities. The operation 1200 may be performed by a wireless communication device such as the BS 102 of FIG. 1, the BS 310 of FIG. 3, the BS 402 of FIG. 4, the BS 704 of FIG. 7B, or the BS 900 of FIG. 9. Although described with reference to the BS 704, the UE 702, and the AMF 706 of FIG. 7B, the example operation 1200 may be performed in conjunction with other suitable base stations, access nodes, TRPs, network functions, or network entities.

At block 1202, the BS receives identity truncating information for truncating one or more fields of a user equipment (UE) identity, the identity truncating information indicating a number of least significant bits (LSBs) of at least one field of the one or more fields of the UE identity to retain.

At block 1204, the BS broadcasts an indication for UEs to use truncated UE identities during radio resource control (RRC) connection procedures, for example, rather than 48-bit 5G-S-TMSIs.

At block 1206, the BS receives a truncated UE identity from the UE in an RRC connection request message, the truncated UE identity generated according to the identity truncating information. In some implementations, the truncated UE identity is generated by retaining only then LSBs of the AMF set identifier of the UE identity, retaining only them LSBs of the AMF pointer of the UE identity, and retaining only the (L−n−m) LSBs of the 5G-TMSI of the UE identity, where L indicates the number of bits in the truncated UE identity. In some instances, the UE is an eMTC device, the UE identity includes 48 bits, and the truncated UE identity consists of 40 bits.

Figure 12B:
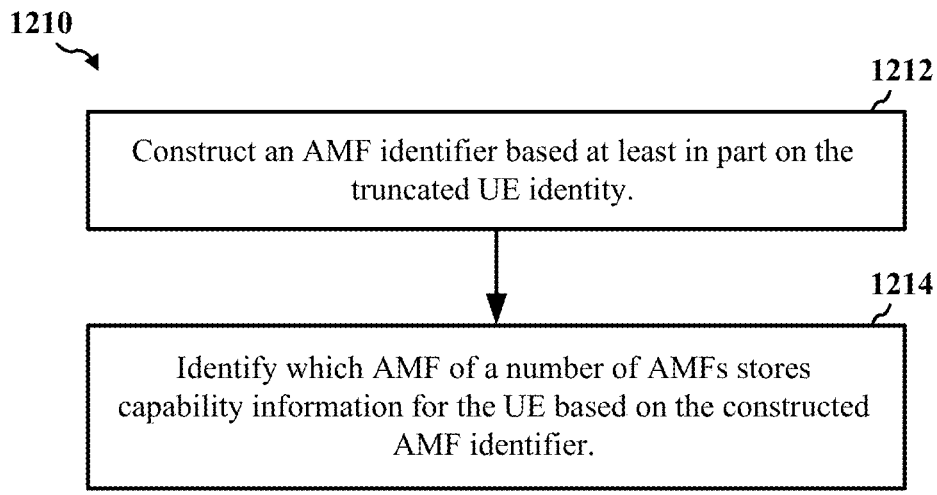

FIG. 12B shows a flowchart depicting an example operation 1210 for wireless communication that supports early retrieval of UE capabilities. The operation 1210 may be performed by a wireless communication device such as the BS 102 of FIG. 1, the BS 310 of FIG. 3, the BS 402 of FIG. 4, the BS 704 of FIG. 7B, or the BS 900 of FIG. 9. Although described with reference to the BS 704, the UE 702, and the AMF 706 of FIG. 7B, the example operation 1210 may be performed in conjunction with other suitable base stations, access nodes, TRPs, network functions, or network entities. In some implementations, the operation 1210 may be performed after receiving the truncated UE identity in block 1206 of the operation 1200 of FIG. 12A.

At block 1212, the BS constructs an AMF identifier based at least in part on the truncated UE identity.

At block 1214, the BS identifies which AMF of a number of AMFs stores capability information for the UE based on the constructed AMF identifier.

Figure 12C:
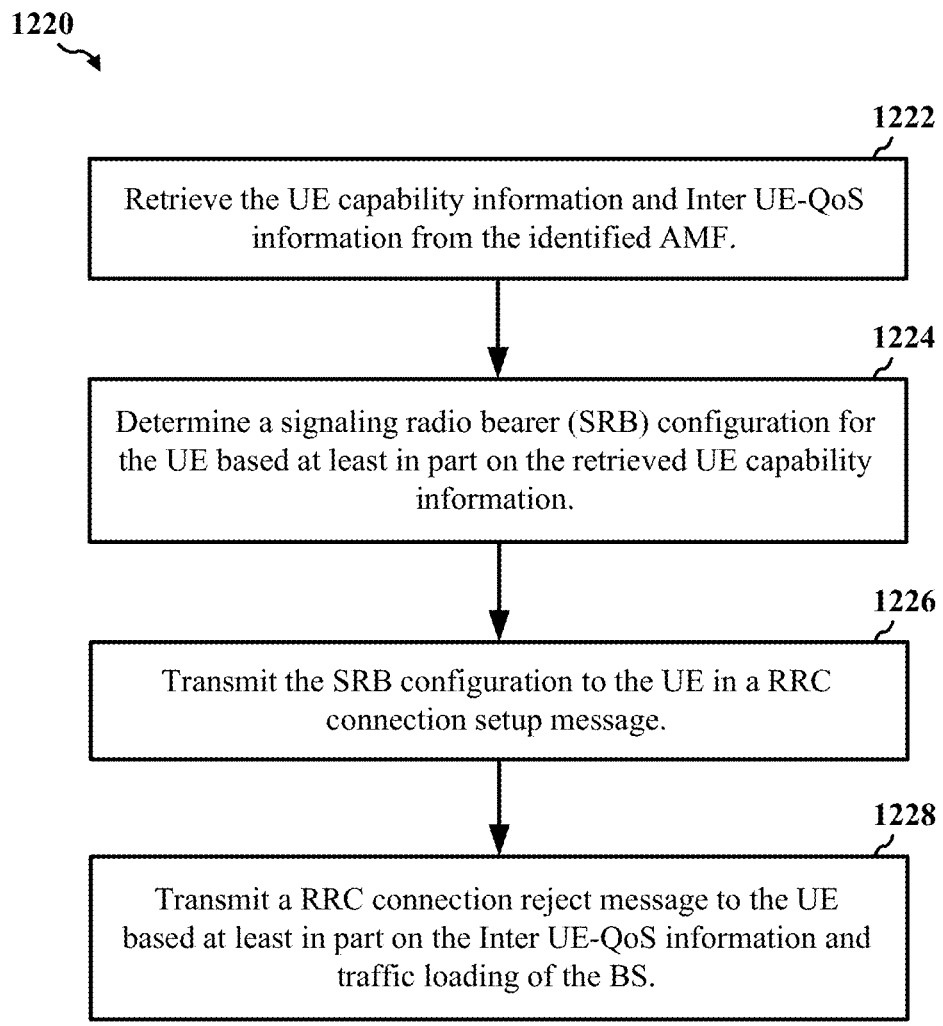

FIG. 12C shows a flowchart depicting an example operation 1220 for wireless communication that supports early retrieval of UE capabilities. The operation 1220 may be performed by a wireless communication device such as the BS 102 of FIG. 1, the BS 310 of FIG. 3, the BS 402 of FIG. 4, the BS 704 of FIG. 7B, or the BS 900 of FIG. 9. Although described with reference to the BS 704, the UE 702, and the AMF 706 of FIG. 7B, the example operation 1220 may be performed in conjunction with other suitable base stations, access nodes, TRPs, network functions, or network entities. In some implementations, the operation 1220 may be performed after identifying the AMF in block 1214 of the operation 1210 of FIG. 12B.

At block 1222, the BS retrieves the UE capability information and Inter-UE QoS information from the identified AMF.

At block 1224, the BS determines a signaling radio bearer (SRB) configuration for the UE based at least in part on the retrieved UE capability information.

At block 1226, the BS transmits the SRB configuration to the UE in an RRC connection setup message.

At block 1228, the BS transmits an RRC connection reject message to the UE based at least in part on the Inter-UE QoS information and traffic loading of the BS.

Thus, operations 1000, 1010, 1020, 1100, 1110, 1120, 1200, 1210, and 1220 may provide for early UE capability retrieval. It should be noted that methods 1000, 1010, 1020, 1100, 1110, 1120, 1200, 1210, and 1220 describe possible implementation, and that the operations and the steps may be rearranged or otherwise modified such that other implementations are possible. In some examples, aspects from two or more of the methods 1000, 1010, 1020, 1100, 1110, 1120, 1200, 1210, and 1220 may be combined.

Aspect 1: A method for wireless communication performed by a UE having a UE identity, the method comprising: receiving identity truncating information; generating a truncated UE identity by truncating one or more fields of the UE identity based on the identity truncating information; and transmitting the truncated UE identity to a base station (BS) during establishment of an RRC connection with the BS.

Aspect 2: The method of aspect 1, wherein the identity truncating information indicates a number of least significant bits (LSBs) of at least one field of the one or more fields of the UE identity to retain during generation of the truncated UE identity.

Aspect 3: The method of aspect 2, wherein the identity truncating information includes a first value indicating the number of LSBs of an Access and Mobility Management Function (AMF) set identifier of the UE identity; and a second value indicating the number of LSBs of an AMF pointer of the UE identity.

Aspect 4: The method of aspect 3, wherein generating the truncated UE identity further comprises: retaining only a number of LSBs according to the first value of the AMF set identifier of the UE identity; and retaining only a number of LSBs according to the second value of the AMF pointer of the UE identity.

Aspect 5: The method of aspect 4, wherein generating the truncated UE identity further comprises: retaining only a (40−n−m) number of LSBs of a Temporary Mobile Station Identifier (TMSI) of the UE identity, wherein n represents the first value and m represents the second value.

Aspect 6: The method of any of aspects 1 through 5, wherein the UE comprises an enhanced machine type communications (eMTC) device, the UE identity comprises 48 bits, and the truncated UE identity comprises of 40 bits.

Aspect 7: The method of any of aspects 1 through 6, wherein the truncated UE identity is transmitted to the BS in an RRC connection request message.

Aspect 8: The method of aspect 7, further comprising: receiving, from the BS, an RRC connection setup message indicating a signaling radio bearer (SRB) configuration based on UE capabilities retrieved from an Access and Mobility Management Function (AMF) of a core network.

Aspect 9: The method of aspect 8, wherein retrieval of the UE capabilities from the AMF is based on the truncated UE identity.

Aspect 10: The method of any of aspects 1 through 9, wherein receiving the identity truncating information further comprises: receiving the identity truncating information from the BS in an SIB.

Aspect 11: The method of any of aspects 1 through 10, further comprising: transmitting, to an Access and Mobility Management Function (AMF) of a core network, a Non-Access Stratum (NAS) registration request message; and receiving, from the AMF, a NAS registration accept message containing the identity truncating information.

Aspect 12: The method of aspect 11, further comprising: receiving, in an SIB broadcast by the BS, an indication to include the truncated UE identity in an RRC connection request message.

Aspect 13: A method for wireless communication performed by a base station (BS), the method comprising: indicating identity truncating information for truncating one or more fields of a UE identity to a UE, the identity truncating information indicating a number of least significant bits (LSBs) of at least one field of the one or more fields of the UE identity to retain; and receiving a truncated UE identity from the UE in an RRC connection request message, the truncated UE identity generated according to the identity truncating information.

Aspect 14: The method of aspect 13, wherein indicating the identity truncating information further comprises: transmitting the identity truncating information to the UE in an SIB.

Aspect 15: The method of aspect 14, wherein a presence of the identity truncating information in the SIB comprises an indication for the UE to transmit the truncated UE identity to the BS in the RRC connection request message.

Aspect 16: The method of any of aspects 13 through 15, wherein indicating the identity truncating information further comprises: broadcasting an indication for UEs to use truncated UE identities during RRC connection procedures.

Aspect 17: The method of any of aspects 13 through 16, further comprising: receiving the identity truncating information from an Access and Mobility Management Function (AMF) of a core network.

Aspect 18: The method of aspect 17, wherein the identity truncating information includes a first value indicating the number of LSBs of an AMF set identifier of the UE identity; and a second value indicating the number of LSBs of an AMF pointer of the UE identity.

Aspect 19: The method of aspect 18, further comprising: determining a difference value of (40−n−m) which indicates the number of LSBs of a Temporary Mobile Station Identifier (TMSI) of the UE identity to be retained when generating the truncated UE identity, wherein n represents the first value and m represents the second value.

Aspect 20: The method of any of aspects 18 through 19, wherein at least one of the first value or the second value is based on a number of AMFs allocated to the core network.

Aspect 21: The method of any of aspects 18 through 20, further comprising: constructing an AMF identifier based at least in part on the truncated UE identity; and identifying which AMF of a number of AMFs stores capability information for the UE based on the constructed AMF identifier.

Aspect 22: The method of aspect 21, wherein construction of the AMF identifier in a given AMF Region identified by a AMF region ID is further based on a number of most significant bits (MSBs) of the AMF set identifier and the AMF pointer, and on the LSBs of the AMF set identifier and the AMF pointer.

Aspect 23: The method of aspect 22, wherein the MSBs of the AMF set identifier and the AMF pointer are received from the identified AMF.

Aspect 24: The method of aspect 23, further comprising: retrieving the UE capability information and Inter-UE QoS information from the identified AMF; determining a signaling radio bearer (SRB) configuration for the UE based at least in part on the retrieved UE capability information; and transmitting the SRB configuration to the UE in an RRC connection setup message.

Aspect 25: The method of aspect 24, further comprising: transmitting an RRC connection reject message to the UE based at least in part on the Inter-UE QoS information and traffic loading of the BS.

Aspect 26: The method of any of aspects 13 through 25, wherein the UE comprises an enhanced machine type communications (eMTC) device, the UE identity comprises 48 bits, and the truncated UE identity comprises of 40 bits.

Aspect 27: The method of any of aspects 13 through 26, further comprising: receiving the identity truncating information from a core network entity.

Aspect 28: An apparatus for wireless communication performed by a UE having a UE identity, comprising a processor; memory coupled with the processor; and instructions stored in the memory and executable by the processor to cause the apparatus to perform a method of any of aspects 1 through 12.

Aspect 29: An apparatus for wireless communication performed by a UE having a UE identity, comprising at least one means for performing a method of any of aspects 1 through 12.

Aspect 30: A non-transitory computer-readable medium storing code for wireless communication performed by a UE having a UE identity, the code comprising instructions executable by a processor to perform a method of any of aspects 1 through 12.

Aspect 31: An apparatus for wireless communication performed by a base station (BS), comprising a processor; memory coupled with the processor; and instructions stored in the memory and executable by the processor to cause the apparatus to perform a method of any of aspects 13 through 27.

Aspect 32: An apparatus for wireless communication performed by a base station (BS), comprising at least one means for performing a method of any of aspects 13 through 27.

Aspect 33: A non-transitory computer-readable medium storing code for wireless communication performed by a base station (BS), the code comprising instructions executable by a processor to perform a method of any of aspects 13 through 27.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by a user equipment (UE) having a UE identity, the method comprising:
   receiving identity truncating information;
   generating a truncated UE identity by truncating one or more fields of the UE identity based on the identity truncating information; and
   transmitting the truncated UE identity during establishment of a radio resource control (RRC) connection with a network entity.

2. The method of claim 1, wherein the identity truncating information indicates a number of least significant bits (LSBs) of at least one field of the one or more fields of the UE identity to retain during generation of the truncated UE identity.

3. The method of claim 2, wherein the identity truncating information includes:
   a first value indicating the number of LSBs of an Access and Mobility Management Function (AMF) set identifier of the UE identity; and
   a second value indicating the number of LSBs of an AMF pointer of the UE identity.

4. The method of claim 3, wherein generating the truncated UE identity further comprises:
   retaining only a number of LSBs according to the first value of the AMF set identifier of the UE identity; and
   retaining only a number of LSBs according to the second value of the AMF pointer of the UE identity.

5. The method of claim 4, wherein generating the truncated UE identity further comprises:
   retaining only a (40−n−m) number of LSBs of a Temporary Mobile Station Identifier (TMSI) of the UE identity, wherein n represents the first value and m represents the second value.

6. The method of claim 1, wherein the UE comprises an enhanced machine type communications (eMTC) device, the UE identity comprises 48 bits, and the truncated UE identity comprises of 40 bits.

7. The method of claim 1, wherein the truncated UE identity is transmitted to the network entity in an RRC connection request message.

8. The method of claim 7, further comprising:
   receiving, from the network entity, an RRC connection setup message indicating a signaling radio bearer (SRB) configuration based on UE capabilities retrieved from an Access and Mobility Management Function (AMF) of a core network.

9. The method of claim 8, wherein retrieval of the UE capabilities from the AMF is based on the truncated UE identity.

10. The method of claim 1, wherein receiving the identity truncating information further comprises:
    receiving the identity truncating information from the network entity in a system information block (SIB).

11. The method of claim 1, further comprising:
    transmitting, to an Access and Mobility Management Function (AMF) of a core network, a Non-Access Stratum (NAS) registration request message; and
    receiving, from the AMF, a NAS registration accept message containing the identity truncating information.

12. The method of claim 11, further comprising:
    receiving, in a system information block (SIB) broadcast by the network entity, an indication to include the truncated UE identity in an RRC connection request message.

13. An apparatus for wireless communication, comprising:
    a processor;
    memory coupled with the processor; and
    instructions stored in the memory and executable by the processor to cause the apparatus to:
    receive identity truncating information;
    generate a truncated UE identity by truncating one or more fields of the UE identity based on the identity truncating information; and
    transmit the truncated UE identity during establishment of a radio resource control (RRC) connection with a network entity.

14. The apparatus of claim 13, wherein the identity truncating information indicates a number of least significant bits (LSBs) of at least one field of the one or more fields of the UE identity to retain during generation of the truncated UE identity.

15. The apparatus of claim 14, wherein the identity truncating information includes:
    a first value indicating the number of LSBs of an Access and Mobility Management Function (AMF) set identifier of the UE identity; and
    a second value indicating the number of LSBs of an AMF pointer of the UE identity.

16. The apparatus of claim 15, wherein the instructions to generate the truncated UE identity are further executable by the processor to cause the apparatus to:
    retain only a number of LSBs according to the first value of the AMF set identifier of the UE identity; and
    retain only a number of LSBs according to the second value of the AMF pointer of the UE identity.

17. The apparatus of claim 16, wherein the instructions to generate the truncated UE identity are further executable by the processor to cause the apparatus to:
    retain only a (40−n−m) number of LSBs of a Temporary Mobile Station Identifier (TMSI) of the UE identity, wherein n represents the first value and m represents the second value.

18. The apparatus of claim 13, wherein the apparatus comprises an enhanced machine type communications (eMTC) device, the UE identity comprises 48 bits, and the truncated UE identity comprises of 40 bits.

19. The apparatus of claim 13, wherein the truncated UE identity is transmitted to the network entity in an RRC connection request message.

20. The apparatus of claim 19, wherein the instructions are further executable by the processor to cause the apparatus to:
   receive, from the network entity, an RRC connection setup message indicating a signaling radio bearer (SRB) configuration based on UE capabilities retrieved from an Access and Mobility Management Function (AMF) of a core network.

21. The apparatus of claim 20, wherein retrieval of the UE capabilities from the AMF is based on the truncated UE identity.

22. The apparatus of claim 13, wherein the instructions to receive the identity truncating information are further executable by the processor to cause the apparatus to:
   receive the identity truncating information from the network entity in a system information block (SIB).

23. The apparatus of claim 13, wherein the instructions are further executable by the processor to cause the apparatus to:
   transmit, to an Access and Mobility Management Function (AMF) of a core network, a Non-Access Stratum (NAS) registration request message; and
   receive, from the AMF, a NAS registration accept message containing the identity truncating information.

24. The apparatus of claim 23, wherein the instructions are further executable by the processor to cause the apparatus to:
   receive, in a system information block (SIB) broadcast by the network entity, an indication to include the truncated UE identity in an RRC connection request message.

* * * * *